(12) United States Patent
Jang et al.

(10) Patent No.: US 11,307,465 B2
(45) Date of Patent: Apr. 19, 2022

(54) DISPLAY DEVICE

(71) Applicant: Samsung Display Co., LTD., Yongin-si (KR)

(72) Inventors: Woo Suk Jang, Cheonan-si (KR); Young Min Cho, Seongnam-si (KR); Ji Young Park, Changwon-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 65 days.

(21) Appl. No.: 16/996,369

(22) Filed: Aug. 18, 2020

(65) Prior Publication Data
US 2021/0132429 A1 May 6, 2021

(30) Foreign Application Priority Data
Oct. 31, 2019 (KR) .................. 10-2019-0137126

(51) Int. Cl.
| G02F 1/1345 | (2006.01) |
| G02F 1/1362 | (2006.01) |
| G02F 1/1333 | (2006.01) |
| H01R 12/62 | (2011.01) |
| H01R 4/04 | (2006.01) |

(52) U.S. Cl.
CPC ...... *G02F 1/13452* (2013.01); *G02F 1/13458* (2013.01); *G02F 1/136286* (2013.01); *H01R 4/04* (2013.01); *H01R 12/62* (2013.01)

(58) Field of Classification Search
CPC .... G02F 1/1335; G02F 1/1362; G02F 1/1345; G02F 1/133305; G02F 1/133514; G02F 1/13452; G02F 1/13454; G02F 1/13456; G02F 1/13458; G02F 1/136286; G02F 1/13336; H01R 4/04; H01R 1/62; H05K 3/323

See application file for complete search history.

(56) References Cited

U.S. PATENT DOCUMENTS

2018/0263123 A1* 9/2018 Chen .................. H05K 1/111

FOREIGN PATENT DOCUMENTS

| KR | 1999-0086094 | 12/1999 |
| KR | 2000-0056805 | 9/2000 |
| KR | 10-2008-0046021 | 5/2008 |
| KR | 10-2014-0038823 | 3/2014 |

* cited by examiner

*Primary Examiner* — Thoi V Duong
(74) *Attorney, Agent, or Firm* — Kile Park Reed & Houtteman PLLC

(57) ABSTRACT

A display device includes a first substrate, first signal lines, and a first signal pad array. The first signal pads each includes a first pad portion connected to a corresponding first signal line, a second pad portion having a width larger than that of the first pad portion, and a third pad portion connecting the first pad portion with the second pad portion and having a width smaller than the width of the second pad portion. The first signal pads are disposed in a shape symmetrical with respect to an imaginary line. Each first signal pad has an angle between a direction in which the third pad portion is extended and a direction in which the second pad portion is extended. The angle of a first signal pad closer to the imaginary line is smaller than the angle of another first signal pad further away from the imaginary line.

29 Claims, 24 Drawing Sheets

DISPLAY DEVICE

CROSS-REFERENCE TO RELATED APPLICATION

This application claims priority to and benefits of Korean Patent Application No. 10-2019-0137126 under 35 U.S.C. § 119 filed in the Korean Intellectual Property Office on Oct. 31, 2019, the entire contents of which are incorporated herein by reference.

BACKGROUND

1. Technical Field

An embodiment relates to a display device.

2. Description of the Related Art

Display devices become more and more important as multimedia technology evolves. Accordingly, a variety of display devices such as liquid-crystal display (LCD) devices and organic light-emitting diode display (OLED) devices are currently being developed.

There may be a region where a driver integrated circuit IC or other printed circuits may be disposed on the outer periphery of the glass substrate of a display device. This region may be referred to as a bezel which may be a non-display area where no image may be displayed. For a tiled display apparatus having a large screen that may be implemented by connecting multiple display devices in a lattice pattern, non-display areas may be formed between the display devices, in each of which the bezel of one of the display devices overlaps or abuts with the bezel of another one. Such non-display areas hinder viewers from getting immersed into the displayed images.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

An embodiment may provide a high-resolution display device having more pads for a given area.

According to an embodiment, a display device may include a first substrate comprising an upper surface and a first side surface; first signal lines disposed on the upper surface of the first substrate; and a first signal pad array comprising first signal pads disposed on the first side surface of the first substrate and spaced apart from one another in a first direction. Each of the first signal pads may comprise a first pad portion connected to a corresponding one of the first signal lines, a second pad portion having a width larger than a width of the first pad portion, and a third pad portion connecting the first pad portion with the second pad portion and having a width smaller than the width of the second pad portion. The first signal pads may be disposed in a shape symmetrical with respect to an imaginary line dividing the first signal pad array into equal halves. Each of the first signal pads may have an angle between a direction in which the third pad portion may be extended and a direction in which the second pad portion may be extended, and the angle of a first signal pad closer to the imaginary line is smaller than the angle of another first signal pad further away from the imaginary line.

The display device may further include a second substrate facing the upper surface of the first substrate, and a liquid-crystal layer disposed between the first substrate and the second substrate.

The angle between the direction in which the third pad portion may be extended and the direction in which the second pad portion may be extended may be from about 0 degrees to about 90 degrees.

The display device may further include a first flexible printed circuit board attached to the first signal pads, and an anisotropic conductive film disposed between the first flexible printed circuit board and the second pad portion of each of the first signal pads. The first flexible printed circuit board may include a first connection pad electrically connected to the second pad portion via the anisotropic conductive film, and a first driver chip.

The display device may further include a printed circuit board. The first flexible printed circuit board may include a second connection pad spaced apart from the first connection pad, and the printed circuit board may be attached to the second connection pad.

The display device may further comprise a second signal pad array comprising second signal pads spaced apart from one another in the first direction, the second signal pad array being spaced apart from the first signal pad array in the first direction. Each of the second signal pads may comprise a first pad portion connected to a corresponding one of the first signal lines, a second pad portion having a width larger than a width of the first pad portion, and a third pad portion connecting the first pad portion with the second pad portion and having a width smaller than the width of the second pad portion. The second signal pads may be disposed in a shape symmetrical with respect to an imaginary line dividing the second signal pad array into equal halves. Each of the second signal pads may have an angle between a direction in which the third pad portion may be extended and a direction in which the second pad portion may be extended. An angle of a second signal pad that may be closer to the imaginary line is smaller than the angle of another second signal pad further away from the imaginary line.

The display device may further comprise a second flexible printed circuit board attached to the second signal pads, and an anisotropic conductive film disposed between the second flexible printed circuit board and the second pad portion of each of the second signal pads. The second flexible printed circuit board may comprise a second connection pad electrically connected to the second pad portion via the anisotropic conductive film. The second flexible printed circuit board may comprise a second driver chip.

The display device may further comprise second signal lines each disposed between adjacent ones of the first signal lines; and a dummy member disposed between the first substrate and the second substrate.

The second substrate may comprise a second side surface aligned with the first side surface. A side surface of the dummy member may be aligned with the first side surface and the second side surface. The display device may comprise a second signal pad array comprising second signal pads disposed on the second side surface of the second substrate and on the side surface of the dummy member and spaced apart from one another in the first direction.

Each of the second signal pads may comprise a fourth pad portion connected to a corresponding one of the second signal lines, a fifth pad portion having a width larger than a width of the fourth pad portion, and a sixth pad portion connecting the fourth pad portion with the fifth pad portion and having a width smaller than the width of the fifth pad portion. The second signal pads may be disposed in a shape symmetrical with respect to an imaginary line dividing the second signal pad array into equal halves. Each of the second signal pads may have an angle between a direction in which the sixth pad portion may be extended and a direction in which the second pad portion may be extended. The angle of a second signal pad closer to the to the imaginary line may be smaller than the angle of another second signal pad further away from the imaginary line.

The display device may further comprise a second flexible printed circuit board attached to the second signal pads, and an anisotropic conductive film disposed between the second flexible printed circuit board and the fifth pad portion of each of the second signal pads.

The second flexible printed circuit board may comprise a second connection pad electrically connected to the fifth pad portion via the anisotropic conductive film. The second flexible printed circuit board may comprise a second driver chip. The first flexible printed circuit board and the second flexible printed circuit board may partially overlap each other.

The display device may further include second signal lines spaced apart from the first signal lines in the first direction, and a dummy member disposed between the first substrate and the second substrate. The second substrate may comprise a second side surface aligned with the first side surface. A side surface of the dummy member may be aligned with the first side surface and the second side surface. The display device may comprise a second signal pad array comprising second signal pads disposed on the second side surface of the second substrate and on the side surface of the dummy member and spaced apart from one another in the first direction.

Each of the second signal pads may comprise a fourth pad portion connected to a corresponding one of the second signal lines, a fifth pad portion having a width larger than a width of the fourth pad portion, and a sixth pad portion connecting the fourth pad portion with the fifth pad portion and having a width smaller than the width of the fifth pad portion. The second signal pads may be disposed in a shape symmetrical with respect to an imaginary line dividing the second signal pad array into equal halves. Each of the second signal pads may have an angle between a direction in which the sixth pad portion may be extended and a direction in which the fifth pad portion may be extended. The angle of a second signal pad closer to the imaginary line may be smaller than the angle of another second signal pad further away from the imaginary line.

The display device may comprise first signal pad arrays and second signal pad arrays. Each of the second signal pad arrays may be disposed between adjacent ones of the first signal pad arrays. The first pad portion and the second pad portion may be extended in the first direction.

The display device may further comprise an anisotropic conductive film disposed between the first signal lines and the first pad portion. The first signal lines and the first pad portion may be electrically connected via the anisotropic conductive film.

The first signal lines may be extended to the first side surface of the first substrate. The first pad portion may be connected to a portion of a corresponding one of the first signal lines, the portion being extended to the first side surface of the first substrate.

The portion extended to the first side surface of the first substrate may be electrically connected to the first pad portion via the anisotropic conductive film.

A width of the first pad portion may be equal to a width of the third pad portion.

According to another embodiment, a display device may comprise a thin-film transistor substrate comprising an upper surface and a first side surface, a color filter substrate facing the upper surface of the thin-film transistor substrate, first signal lines disposed on the upper surface of the thin-film transistor substrate, a first signal pad array comprising first signal pads disposed on the first side surface of the thin-film transistor substrate and spaced apart from one another in a first direction, a flexible printed circuit board attached to the first signal pads, and an anisotropic conductive film disposed between the flexible printed circuit board and the second pad portion of each of the first signal pads. Each of the first signal pads comprises a first pad portion connected to a corresponding one of the first signal lines, a second pad portion having a width larger than a width of the first pad portion, and a third pad portion between the first pad portion with the second pad portion and having a width smaller than the width of the second pad portion. The first signal pads may be disposed in a shape symmetrical with respect to an imaginary line dividing the first signal pad array into equal halves. Each of the signal pads may have an angle between a direction in which the third pad portion may be extended and a direction in which the second pad portion may be extended. The angle of a first signal pad closer to the imaginary line is smaller than the angle of another first signal pad further away from the imaginary line.

The flexible printed circuit board may comprise a first connection pad electrically connected to the second pad portion via the anisotropic conductive film. The flexible printed circuit board may comprise a first driver chip.

The display device may further comprise a printed circuit board. The flexible printed circuit board may include a second connection pad spaced apart from the first connection pad, and the printed circuit board may be attached to the second connection pad.

The display device may further comprise a sealing member disposed on the first side surface of the thin-film transistor substrate and overlapping the first pad portion and the second pad portion.

The sealing member may be disposed between the flexible printed circuit board and the first signal pads.

The sealing member may not overlap the third pad portion.

It should be noted that aspects of the disclosure may not be limited to the above-mentioned aspects; and other aspects of the disclosure will be apparent to those skilled in the art from the following descriptions.

According to an embodiment of the disclosure, more pads can be disposed for a given area to thereby achieve a high-resolution.

It should be noted that effects of the disclosure are not limited to those described above and other effects of the disclosure will be apparent to those skilled in the art from the following descriptions.

BRIEF DESCRIPTION OF THE DRAWINGS

The above and other aspects and features of the disclosure will become more apparent by describing in detail embodiments thereof with reference to the attached drawings, in which.

DETAILED DESCRIPTION OF THE EMBODIMENTS

Figure 1:
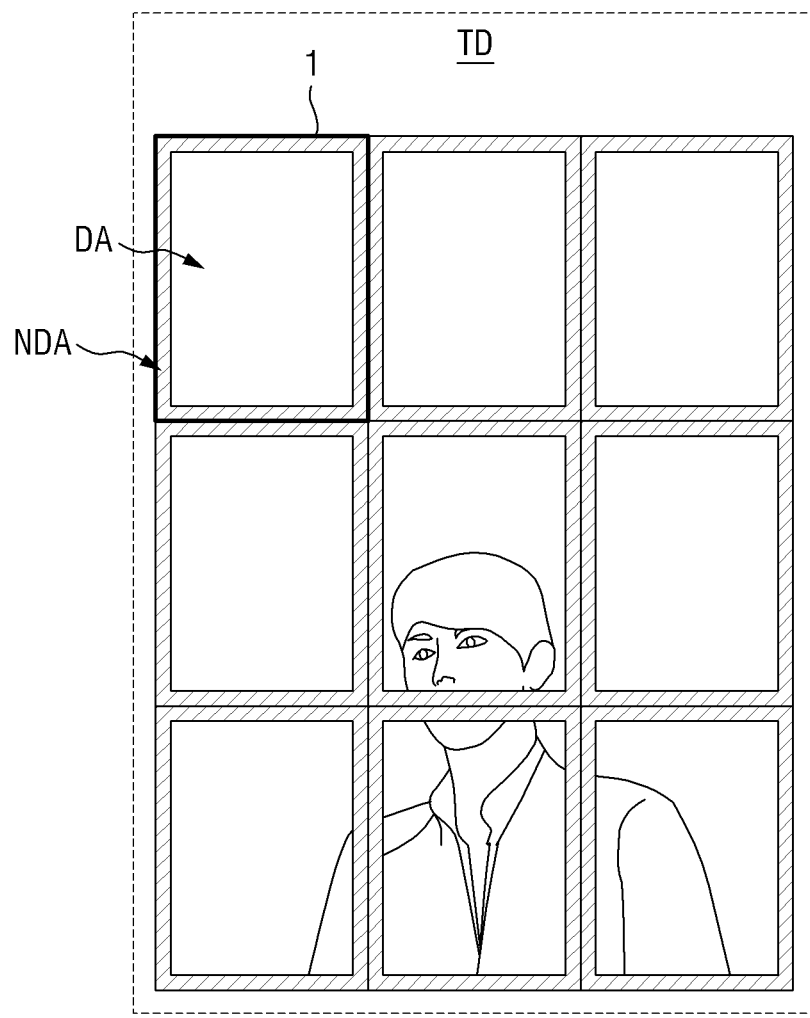
FIG. 1 is a schematic view showing a tiled display apparatus.

Hereinafter, embodiments will be described with reference to the attached drawings. Throughout the specification, the same reference numerals will refer to the same or like parts.

Specific structural and functional descriptions of embodiments disclosed herein are only for illustrative purposes of the embodiments. The invention may be embodied in many different forms without departing from the spirit and significant characteristics of the disclosure. Therefore, the embodiments are disclosed only for illustrative purposes and should not be construed as limiting. The invention is only defined by the scope of the claims, including any equivalents.

It will be understood that when an element is referred to as being related to another element such as being "connected" to another element, it can be directly connected to the other element or intervening elements may be present therebetween. In contrast, it should be understood that when an element is referred to as being related to another element such as being "directly connected" to another element, there may be no intervening elements present. Other expressions that explain the relationship between elements, such as "between," "directly between," "adjacent to," or "directly adjacent to," should be construed in the same way.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." As used herein, the term "and/or" includes any and all combinations of one or more of the associated listed items. The terms "and" and "or" may be used in the conjunctive or disjunctive sense and may be understood to be equivalent to "and/or." It will be further understood that the terms "comprises", "comprising", "includes", "including", "has", "have", "having", and the like, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower", "bottom", "upper", "top", "left", "right", "front", and "back" may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would be oriented on "upper"

sides of the other elements. The term "lower," can therefore, encompasses both an orientation of "lower" and "upper," depending on the particular orientation of the figure. Similarly, if the device in one of the figures is turned over, elements described as "below" or "beneath" other elements would be oriented "above" the other elements. The terms "below" or "beneath" can, therefore, encompass both an orientation of above and below. Similarly, elements described as, for example, on a "left" or "right" side, and in "front" or "behind" can be moved and would be differently oriented but still within the scope of the disclosure.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

The term "overlap" may include layer, stack, face or facing, extending over, covering or partly covering, abut, or any other suitable term as would be appreciated and understood by those of ordinary skill in the art. The expression "do not overlap" may include "apart from" or "set aside from" or "offset from" and any other suitable equivalents as would be appreciated and understood by those of ordinary skill in the art.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Figure 2:
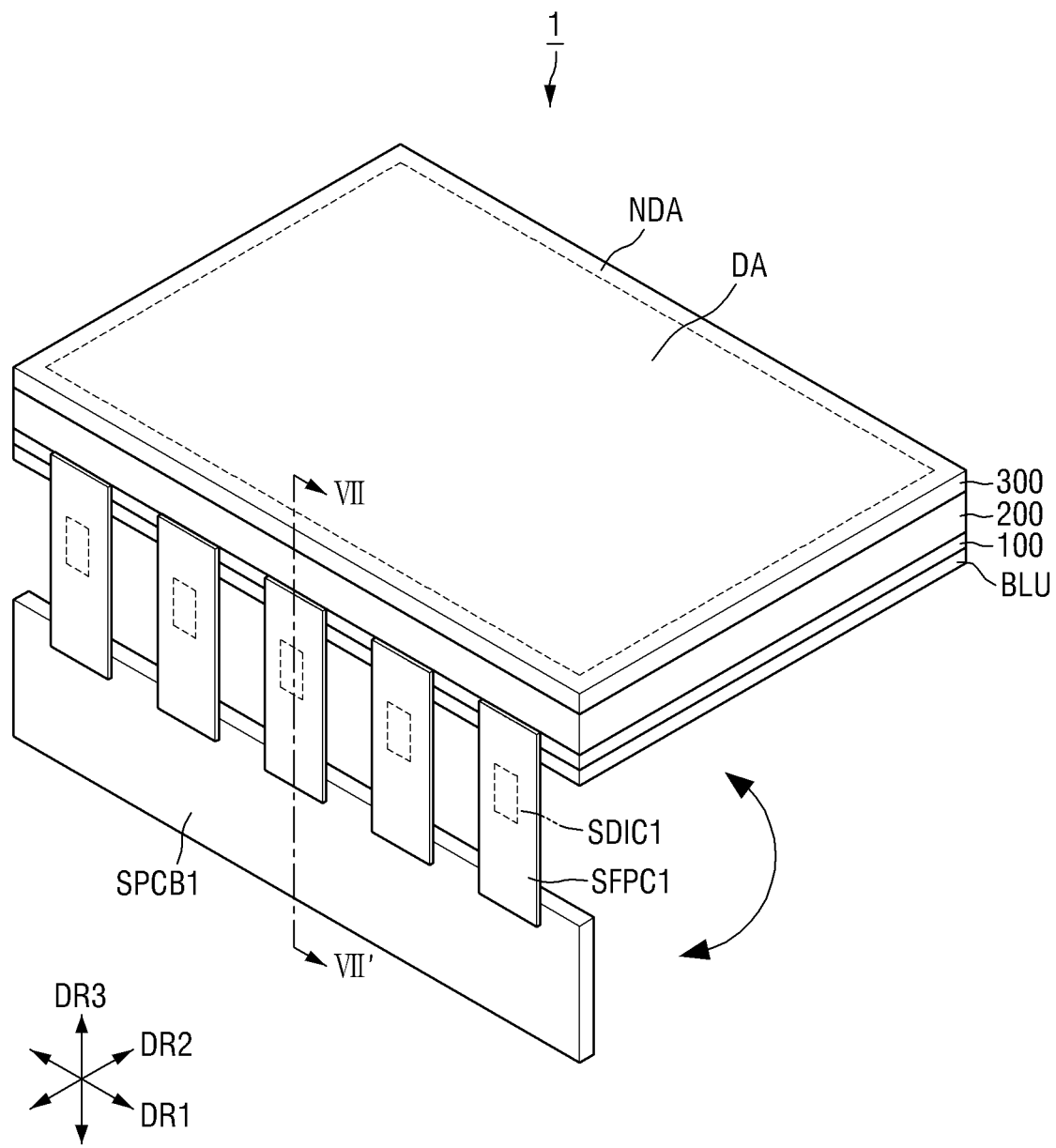
FIG. 2 is a schematic perspective view of a display device according to an embodiment of the disclosure.
Figure 3:
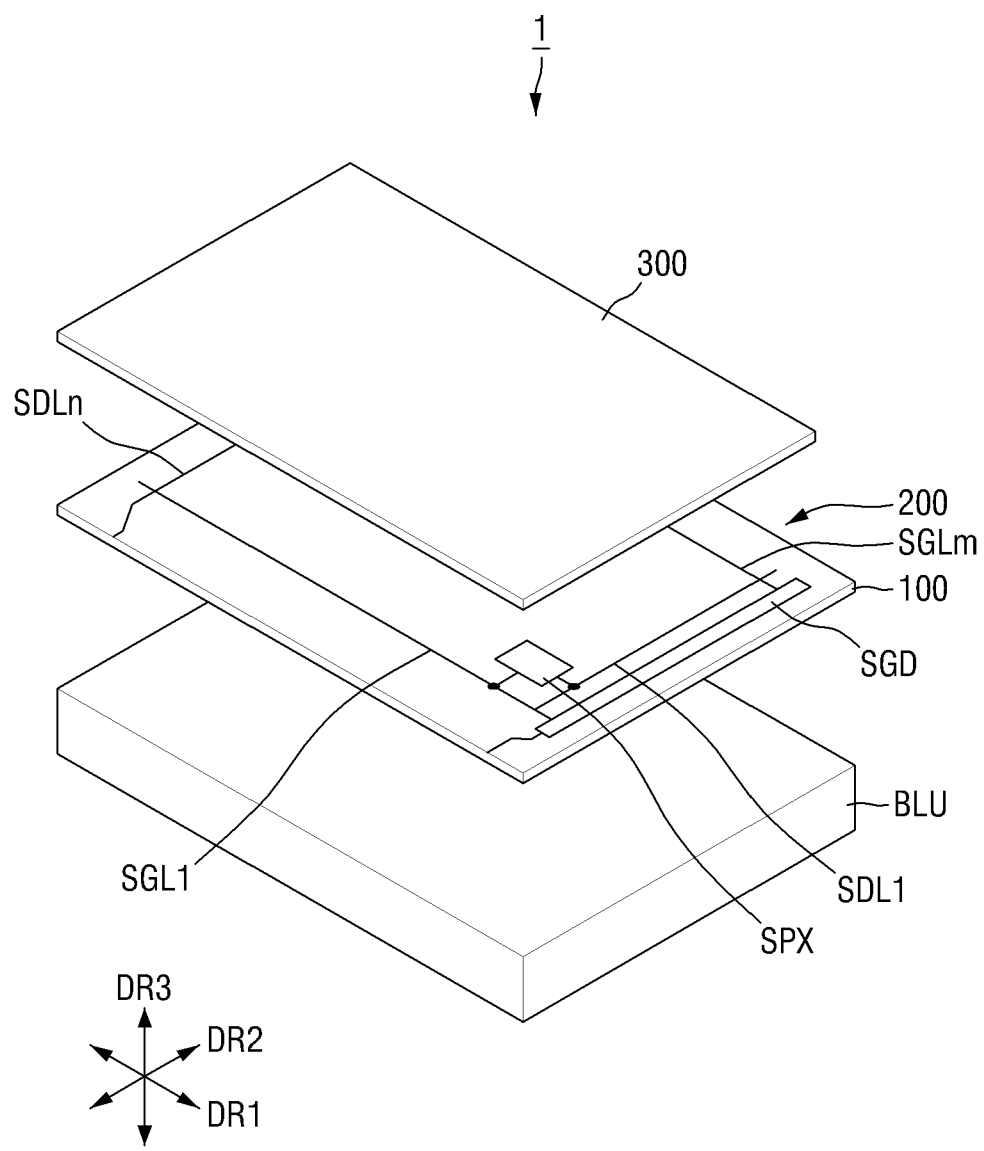
FIG. 3 is an exploded schematic perspective view of a part of the display device shown in FIG. 2.
Figure 4:
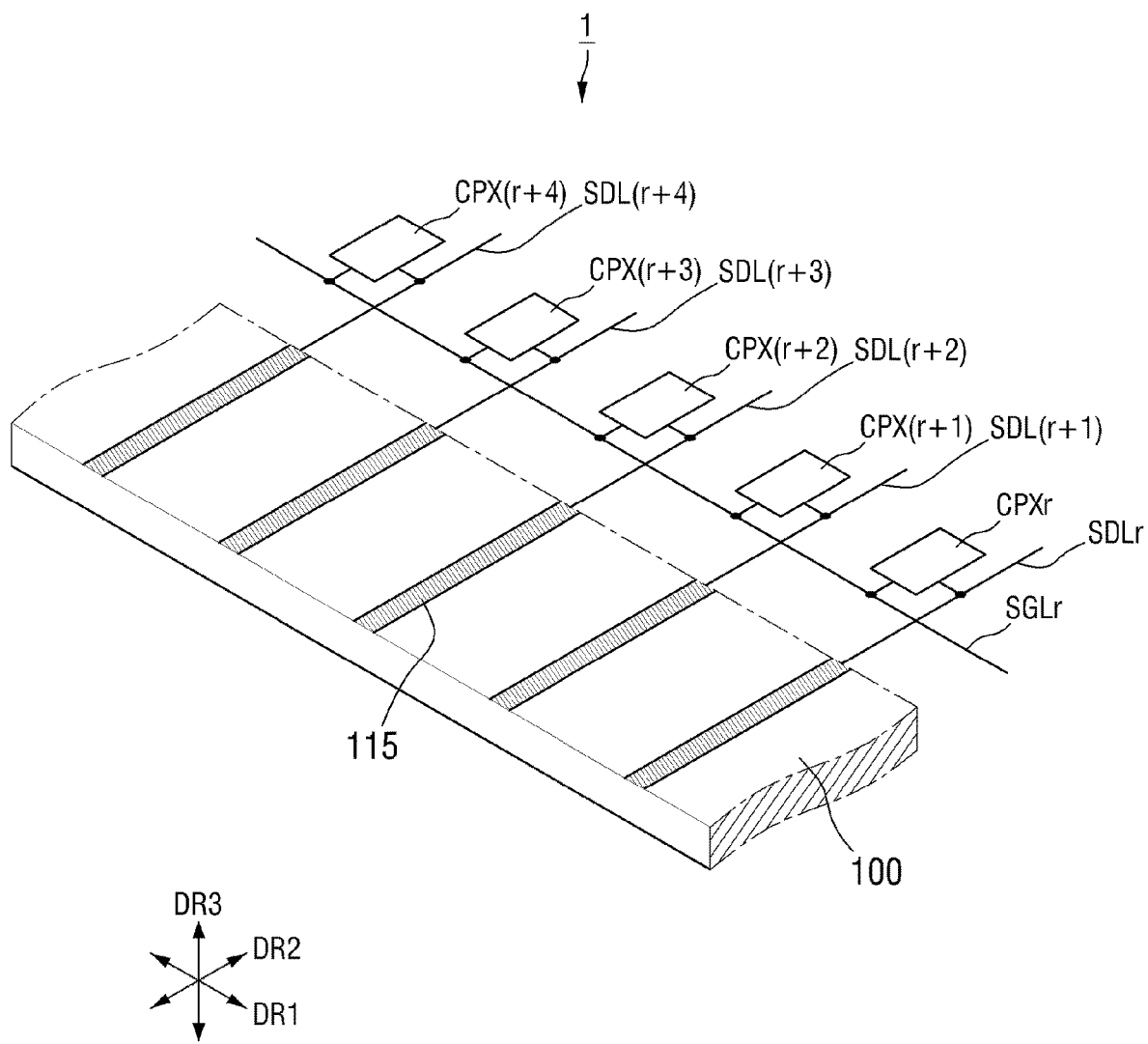
FIG. 4 is a schematic view showing pixels of a first substrate and connection lines connected thereto.

FIG. 1 is a schematic view showing a tiled display apparatus. FIG. 2 is a schematic perspective view of a display device according to an embodiment of the disclosure. FIG. 3 is an exploded schematic perspective view of a part of the display device shown in FIG. 2. FIG. 4 is a schematic view showing pixels of a first substrate and connection lines electrically connected thereto.

In the following description, a liquid-crystal display device including a liquid-crystal layer may be employed as the display device. It is, however, to be understood that the disclosure is not limited thereto. For example, a display device other than a liquid-crystal display device (for example, an organic light-emitting display device) may be employed, in which case some elements to be described below may be eliminated, or other elements may be added.

A display device according to an embodiment of the disclosure may be used in a large electronic device such as a television or an electric board, as well as in a small or medium electronic device such as a personal computer, a laptop computer, a vehicle navigation device or a camera, etc. The display device may be used in a tablet PC, a smart phone, a personal digital assistant (PDA), a portable multimedia player (PMP), a game device, a wristwatch type electronic device, etc. The above-listed electronic devices are merely illustrative and the display device may be employed by other display devices.

Referring to FIG. 1, a tiled display apparatus TD may include multiple display devices 1. In an embodiment, the display devices 1 may be arranged in a lattice pattern, but the disclosure is not limited thereto. The display devices 1 may be connected in a first direction or a second direction or may be connected in a particular pattern. The display devices may have the same size, but the disclosure is not limited thereto. The display devices may have different sizes.

In an embodiment, the multiple display devices 1 included in the tiled display apparatus TD may have a rectangular shape including longer sides and shorter sides. The longer sides or the shorter sides of each of the display devices 1 may be connected to the longer sides or the shorter sides of adjacent display devices. Some of the display devices 1 may form a side of the tiled device apparatus TD, some of the display devices 1 may be located at a corner of the tiled display apparatus TD to form two adjacent sides, and some of the display devices 1 may be located on the inner side of the tiled device apparatus TD and surrounded by others of the display devices 1. The display devices 1 may have different bezel shapes depending on the locations, or may have the same bezel shape.

The tiled display apparatus TD may have a flat shape, but the disclosure is not limited thereto. The tiled display apparatus TD may have a three-dimensional shape to give a three-dimensional effect. In case that the tiled display apparatus TD has a three-dimensional shape, each of the display devices 1 included in the tiled display apparatus TD may have a curved shape, and may be connected to one another in a planar shape or at an angle, such that the tiled display apparatus TD may be formed in three-dimensional shape.

The bezels of the multiple display devices 1 may be connected with one another directly or may be connected with one another by a connecting member (not shown). As such, since the display devices 1 may be connected with one another in the tiled display apparatus TD, two bezels of the adjacent display devices 1 may be disposed together at each connection portion. Therefore, each of the display devices 1 may be required to have a thin bezel. To this end, a side connection pad may be disposed. A more detailed description thereon will be made below.

Hereinafter, embodiments of the display device 1 will be described in detail, which may be employed as one of the display devices 1 of the tiled display apparatus TD or may be used alone.

Referring to FIGS. 2 to 5, each of the display devices 1 may include a first substrate 100, a liquid-crystal layer 200, and a second substrate 300. In an embodiment, the display device 1 may further include first flexible printed circuit boards SFPC1, a first driving circuit board SPCB1, and a backlight part BLU.

The first substrate 100, the second substrate 300 and the backlight part BLU may have a rectangular shape that has longer sides in the first direction DR1 and shorter sides in the second direction DR2 perpendicular to the first direction DR1. It is, however, to be understood that the shapes of the first substrate 100, the second substrate 300 and the backlight part BLU are not limited thereto. Some portions of the first substrate 100, the second substrate 300 and the backlight part BLU may have curved portions as desired.

The backlight part BLU may generate light and may provide the generated light to the first substrate 100, the liquid-crystal layer 200 and the second substrate 300. A display panel may include the first substrate 100, the liquid-crystal layer 200 and the second substrate 300, and may generate an image using the light provided from the backlight part BLU, and may provide it to the outside.

The display panel may include a display area DA where images may be displayed, and a non-display area NDA where no image may be displayed. The non-display area NDA may surround the display area DA, for example. Although not shown in the drawings, the display device 1 may further include a window member on the second substrate 300, which covers the display panel and transmits an image to the outside.

The backlight part BLU may be, for example, an edge-lit backlight part or a direct-lit backlight part, but the embodiments of the disclosure are not limited thereto.

The first substrate 100 may include pixels SPX. In an embodiment, the pixels SPX may be arranged in a matrix. It is, however, to be understood that the disclosure is not limited thereto. Gate lines SGL1 to SGLm and data lines SDL1 to SDLn may be disposed along the boundaries of the pixels SPX, where m and n may be natural numbers. The gate lines SGL1 to SGLm may serve as selection lines for selecting among the pixels SPX. The first substrate 100 may be a thin-film transistor substrate including thin-film transistors. Each of the thin-film transistors may include a gate electrode transistor disposed on the same layer as the above-described gate lines, a semiconductor layer overlapping with the gate electrode of the thin-film transistor in the thickness direction, and a drain electrode and a source electrode connected to the semiconductor layer. The drain electrode and the source electrode may be disposed on the same layer, and may be disposed on the same layer as the above-described data lines.

Although only one pixel SPX is depicted in FIG. 3 for convenience of illustration, it is to be understood that multiple pixels SPX may be defined on the first substrate 100 in practice. In each of the pixels SPX, a pixel electrode defining the pixel may be disposed.

The gate lines SGL1 to SGLm and the data lines SDL1 to SDLn may be insulated from one another and intersect with one another. The gate lines SGL1 to SGLm may be extended in the first direction DR1 and may be electrically connected to a gate driver SGD. The data lines SDL1 to SDLn may be extended in the second direction DR2 and may be electrically connected to a data driver SDD.

The pixels SPX may be electrically connected to the gate lines SGL1 to SGLm and the data lines SDL1 to SDLn intersecting each other. The pixels SPX may be arranged, but are not limited to being, in a matrix.

The gate driver SGD may be disposed at a location adjacent to at least one of the shorter sides of the first substrate 100, for example. It is, however, to be understood that the location of the gate driver SGD is not limited thereto.

For example, the gate driver SGD may be formed during a process of fabricating transistors for driving the pixels SPX and may be mounted on the first substrate 100 in the form of an amorphous silicon TFT gate driver circuit (ASG) or an oxide silicon TFT gate driver (OSG).

It is, however, to be understood that the disclosure is not limited thereto. The gate driver SGD may be formed of driver chips, may be mounted on a flexible driving circuit board, and may be mounted on the first substrate 100 by using tape carrier package (TCP) technique. The gate driver SGD may be formed of driver chips and may be mounted on the first substrate 100 by using chip-on-glass (COG) technique.

The data driver SDD may include first source driver chips SDIC1. The data driver SDD may include a single first source driver chip SDIC1 or more than one first source driver chips SDIC1. Although five first source driver chips SDIC1 may be disposed in the example shown in FIG. 2, it is to be understood that the number of the first source driver chips SDIC1 may not be limited to five.

The first driving printed circuit board SPCB1 may include, for example, a timing controller (not shown). The timing controller may be mounted on the first driving printed circuit board SPCB1 in the form of an integrated circuit chip and electrically connected to the gate driver SGD and the data driver SDD. The timing controller may output a gate control signal, a data control signal, and image data.

The gate driver SGD may receive the gate control signal from the timing controller. The gate driver SGD may generate gate signals in response to the gate control signal and sequentially output the generated gate signals. The gate signals may be applied to the pixels via gate lines SGL1 to SGLm row by row. As a result, the pixels SPX can be driven row by row.

The data driver SDD may receive image data and the data control signal from the timing controller. The data driver SDD may generate analog data voltages corresponding to the image data in response to the data control signal, to output them. The data voltages may be provided to the pixels SPX through the data lines SDL1 to SDLn.

The pixels SPX may receive data voltages through the data lines SDL1 to SDLn in response to the gate signals provided through the gate lines SGL1 to SGLm. The pixels SPX may display grayscale corresponding to the data voltages, thereby controlling the transmittance of the region in which each pixel SPX may be disposed.

Although the first flexible printed circuit boards SFPC1 may be depicted as being connected to the longer sides of the first and second substrates 100 and 300 in FIG. 2, embodiments of the disclosure are not limited thereto. The locations where the first flexible printed circuit boards SFPC1 may be connected to the first and second substrates 100 and 300 may be altered as desired. For example, the first flexible printed circuit boards SFPC1 may be disposed adjacent to shorter sides of the first and second substrates 100 and 300. The first flexible printed circuit boards SFPC1 may be disposed at each of the longer sides of the first and second substrates 100 and 300. The first flexible printed circuit boards SFPC1 may be disposed at the shorter side of each of the first and second substrates 100 and 300 or may be disposed at each of the longer side and shorter side.

More than one first flexible printed circuit boards SFPC1 may be disposed. The first flexible printed circuit boards SFPC1 may be spaced apart from one another along the first direction DR1. The first flexible printed circuit boards SFPC1 may be attached to the first driving circuit board SPCB1 and electrically connected to the first driving circuit board SPCB1, respectively.

Referring to FIG. 4, first connection lines 115 may be disposed. The first connection lines 115 may be arranged such that they may be spaced apart from one another along the first direction DR1. The first connection lines 115 may be electrically connected to data lines SDLr to SDL(r+4), respectively, where r may be a natural number. The first connection lines 115 may be extended to the end of the first substrate 100.

The gate line SGLr may intersect the data lines SDLr to SDL(r+4). Pixels CPXr to CPX(r+4) may be electrically connected to the gate line SGLr.

Although only five connection lines 115 may be shown in FIG. 4, this is for the sake of understanding. In practice, the number of the connection lines 115 electrically connected to the data lines SDLr to SDL(r+4) may be larger than or less than five.

The data lines SDLr to SDL(r+4) may be electrically connected to the pixels CPXr to CPX(r+4), respectively. Accordingly, the connection lines 115 may be electrically connected to the pixels CPXr to CPX(r+4), respectively. The connection lines 115 may include, but may not be limited to, copper (Cu).

Referring to FIG. 2, the first source driver chips SDIC1 mounted on the first flexible printed circuit boards SFPC1 may generate data voltages for driving the pixels CPXr to CPX(r+4) that may be electrically connected to the first source driver chips SDIC1. The generated data voltages may be transferred to the data lines SDLr to SDL(r+4).

Figure 5:
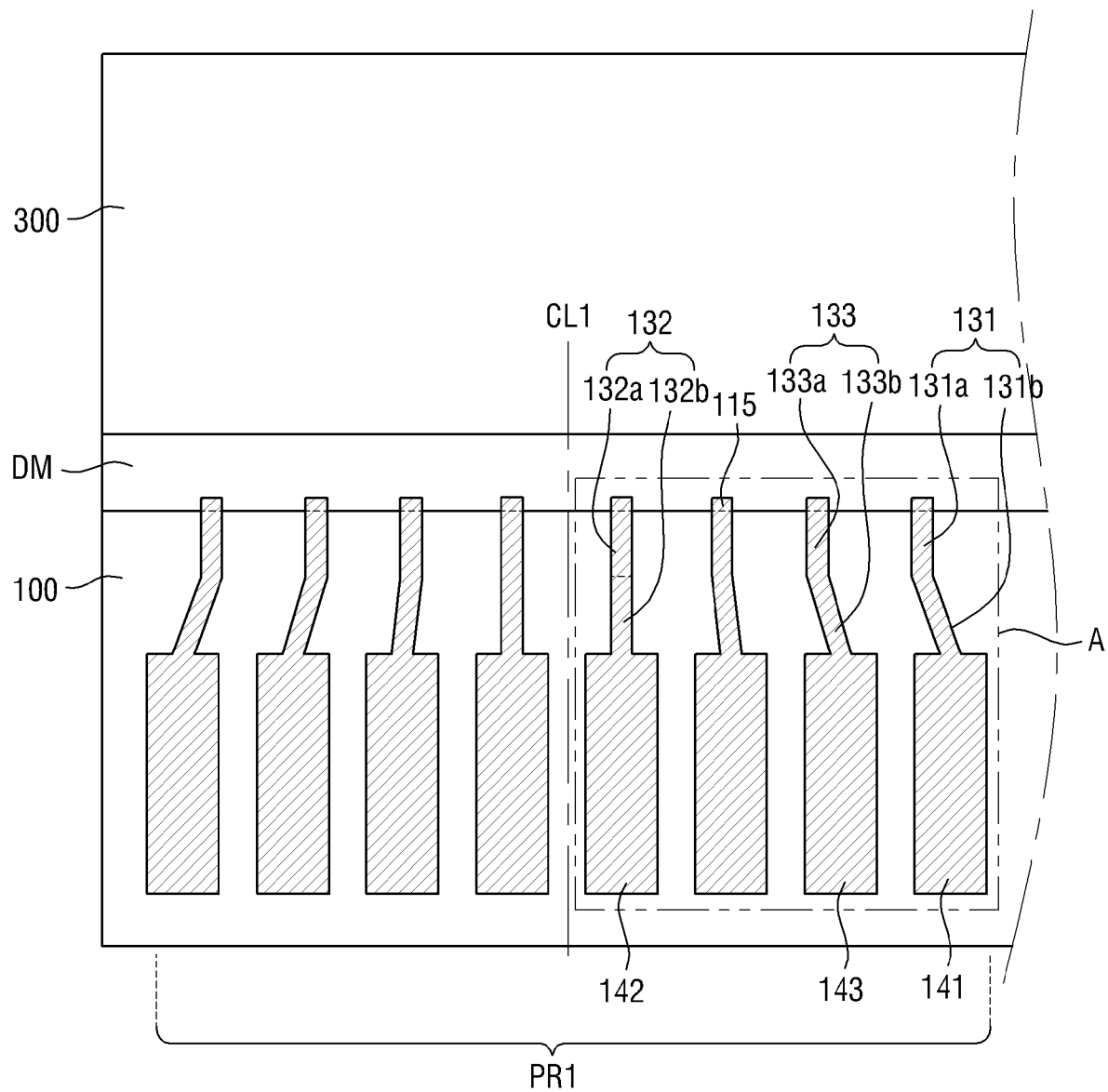
FIG. 5 is a schematic plan view showing a layout of signal pads disposed on a side surface of the first substrate according to an embodiment of the disclosure.
Figure 6:
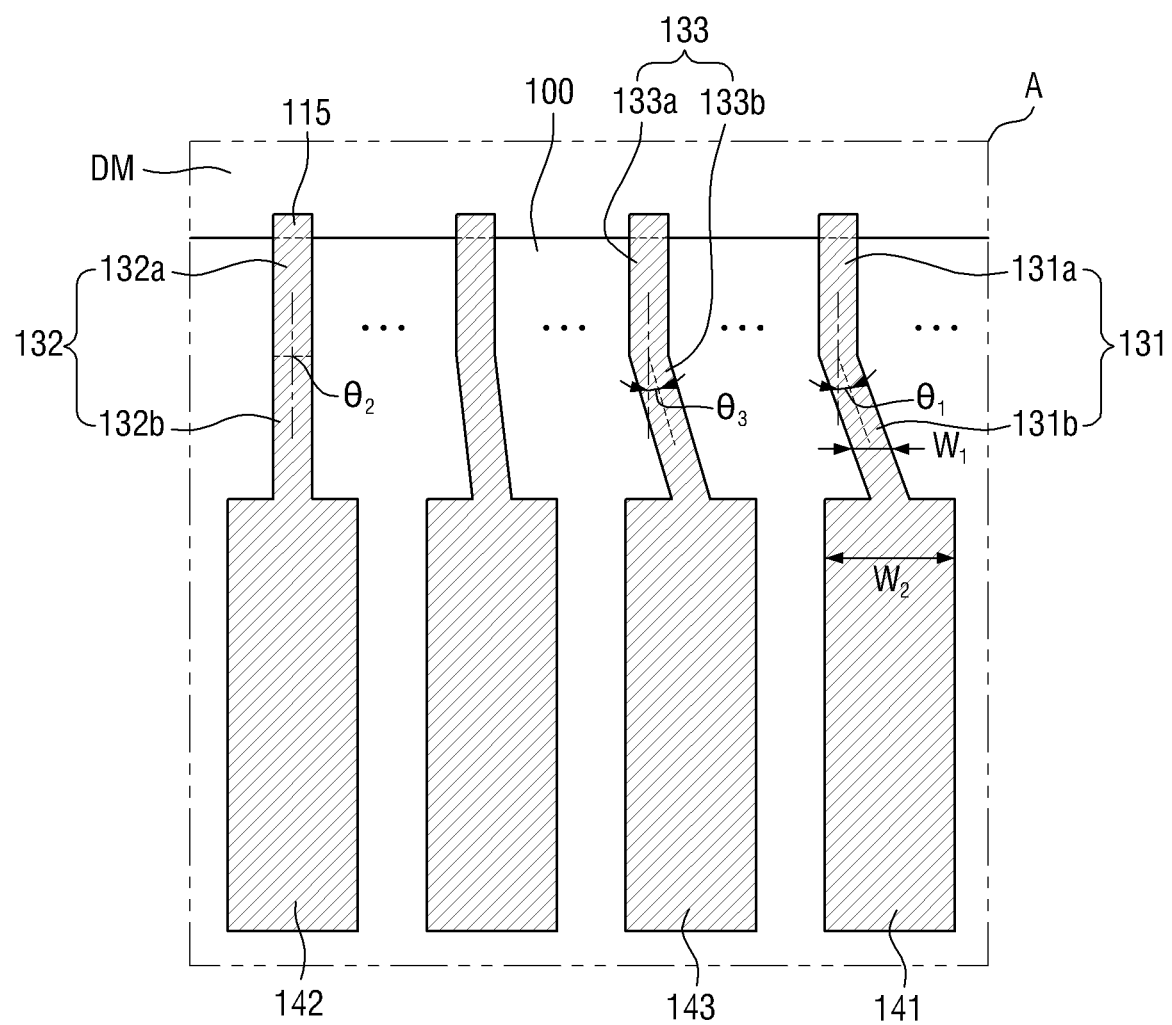
FIG. 6 is an enlarged schematic view of area A shown in FIG. 5.
Figure 7:
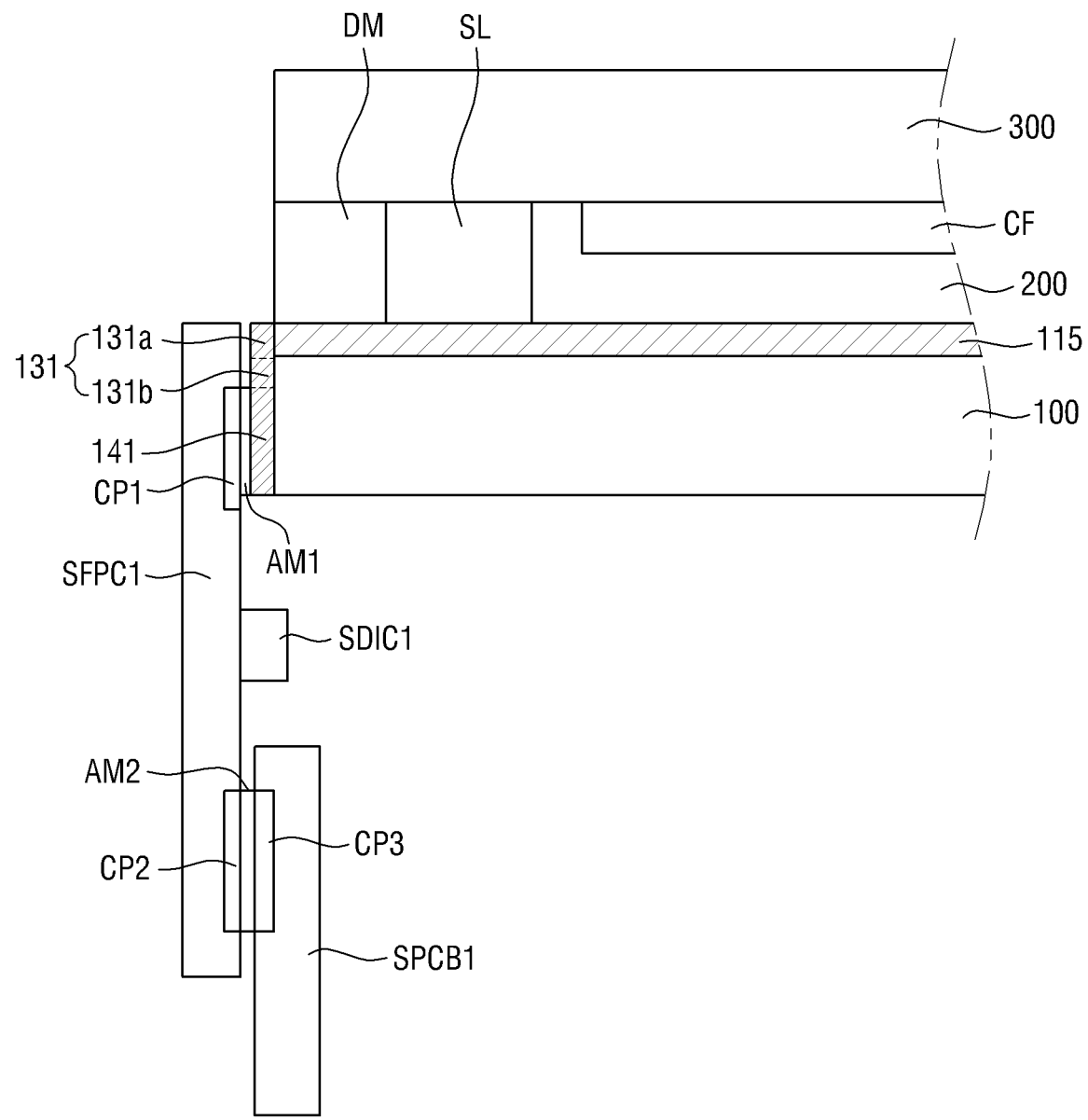
FIG. 7 is a schematic cross-sectional view taken along line VII-VII' of FIG. 2.

FIG. 5 is a schematic plan view showing a layout of signal pads disposed on a side surface of the first substrate according to an embodiment of the disclosure. FIG. 6 is an enlarged schematic view of area A shown in FIG. 5. FIG. 7 is a schematic cross-sectional view taken along line VII-VII' of FIG. 2.

Referring to FIGS. 5 to 7, a color filter layer CF and a sealant SL may be disposed between the first substrate 100 and the second substrate 300. The color filter layer CF may serve to improve the quality of an image output from the display device 1. The sealant SL may be disposed along the edges of the two substrates 100 and 300 on the outer side of the color filter layer CF in order to prevent leakage of the liquid-crystal layer 200 used to fill between the first and second substrates 100 and 300. The second substrate 300 may be a color filter substrate under which the color filter layer CF may be disposed.

A dummy pattern DM may be disposed between the first substrate 100 and the second substrate 300. In an embodiment, the dummy pattern DM may be fixed to the second substrate 300 and may have an end facing the first substrate 100. An end of the dummy pattern DM may be in contact with the features on the first substrate 100. For example, an end of the dummy pattern DM may be in contact with the first connection lines 115. The dummy pattern DM may have a line shape extended between one side surface of the first substrate 100 and one side surface of the second substrate 300 when viewed from the top. It is, however, to be understood that the disclosure is not limited thereto. The dummy pattern DM may be disposed in the form of islands such that the islands may be in contact with the first flexible printed circuit boards SFPC1, respectively. The dummy pattern DM may be disposed on the four sides such that it surrounds the edges of the first substrate 100 and the second substrate 300.

The dummy pattern DM may be formed by stacking the same material as the color filter layer CF. It is, however, to be understood that the disclosure is not limited thereto. The dummy pattern DM may be eliminated, and a column spacer may be disposed in place of the dummy pattern DM. In another example, the width of the sealant SL may be increased to replace the dummy pattern DM.

The first substrate 100 may include an upper surface facing the second substrate 300 and a first side surface. The above-described first connection lines 115 may be disposed on the upper surface of the first substrate 100 and may be extended toward the side surface of the first substrate 100.

The second substrate 300 may include a second side surface aligned with the first side surface of the first substrate 100 in the thickness direction. The side surfaces of the first substrate 100 and the second substrate 300 may be aligned with the side surface of the dummy pattern DM in the thickness direction.

As shown in FIG. 5, signal pads (e.g., first signal pad 131 and 141, second signal pad 132 and 142, and third signal pad 133 and 143) may be disposed on the first side surface of the first substrate 100. The signal pads may be spaced apart from one another along the first direction DR1. The signal pads may form a first signal pad array PR1 arranged along the first direction DR1.

The signal pads may be connected to the first connection lines 115, respectively. As shown in FIG. 7, the signal pads may be electrically connected (e.g., directly) to the first connection lines 115. It is, however, to be understood that the disclosure is not limited thereto. In some embodiments, the signal pads may be electrically connected to the first connection lines 115 via an anisotropic conductive film.

The signal pads may be disposed in a shape symmetrical with respect to a first virtual line CL1 (an imaginary line that may extend in the thickness direction) that may divide the first signal pad array PR1 into equal halves. In the drawings, a first signal pad 131 and 141 may be disposed on the right hand, a second signal pad 132 and 142 may be disposed adjacent to the first virtual line CL1, and a third signal pad 133 and 143 may be disposed between the first signal pad 131 and 141 and the second signal pad 132 and 142.

Each of the signal pads may include, but may not be limited to, silver (Ag). The material of the signal pads may include a typical conductive material.

The signal pads may include first pad portions 131a, 132a and 133a connected to the first connection lines 115, respectively; second pad portions 141, 142 and 143 connected to first contact pads CP1 of the first flexible printed circuit board SFPC1 as shown in FIG. 7; and third pad portions 131b, 132b and 133b disposed between the first pad portions 131a, 132a and 133a, and the second pad portions 141, 142 and 143, respectively, to connect the first pad portions 131a, 132a and 133a and the second pad portions 141, 142, 143.

The first pad portions 131a, 132a and 133a and the second pad portions 141, 142 and 143 of the signal pads may be extended along the thickness direction (third direction DR3), while the third pad portions 131b, 132b and 133b may be extended in a direction different from the third direction DR3.

Referring to FIG. 6, the first pad portions 131a, 132a and 133a and the third pad portions 131b, 132b and 133b may have a first width W1 in the first direction DR1. The second pad portions 141, 142 and 143 may have a second width W2 in the first direction DR1.

The second width W2 may be greater than the first width W1.

The second pad portions 141, 142 and 143 may be bonded to the first contact pads CP1 of the first flexible printed circuit boards SFPC1. In the display device 1 according to this embodiment, the second widths W2 of the second pad portions 141, 142 and 143 bonded to the first contact pads CP1 of the first flexible printed circuit boards SFPC1 may be greater than the first widths W1 of the first pad portions 131a, 132a and 133a to be connected to the first connection lines 115, so that a bonding force with the first contact pads CP1 may be increased. As a result, it may be possible to prevent connection failure.

Angles between the direction in which the second pad portions 141, 142 and 143 and the first pad portions 131a, 132a and 133a may be extended and the direction in which the third pad portions 131b, 132b and 133b may be extended may be acute angles. As used herein and as shown in the drawings, an "acute" angle may include about 0 degrees to about 90 degrees. The angles between the direction in which the third pad portions 131b, 132b and 133b may be extended and the direction in which the second pad portions 141, 142 and 143 and the first pad portions 131a, 132a and 133a may be extended may decrease toward the first virtual line CL1.

For example, as shown in FIG. 6, the first signal pad may have a first angle θ1 between the direction in which the second pad portion 141 may be extended and the direction in which the third pad portion 131b may be extended. The second signal pad may have a second angle θ2 between the direction in which the second pad portion 142 may be extended and the direction in which the third pad portion 132b may be extended. The third signal pad may have a third angle θ3 between the direction in which the second pad portion 143 may be extended and the direction in which the third pad portion 133b may be extended. The first angle θ1 may be greater than the second angle θ2 and the third angle θ3, and the third angle θ3 may have a value between the first angle θ1 and the second angle θ2. For example, the second angle θ2 may be 0 degrees (i.e., 180 degree opposite angle). The second pad portion 142 and the third pad portion 132b may be extended in a line shape or a straight line shape.

For the signal pads disposed on the first side surface of the first substrate 100, the spacing distances between the second pad portions 141, 142 and 143 bonded to the first flexible printed circuit boards SFPC1 and the first pad portions 131a, 132a and 133a in the first direction DR1 may increase toward the edge from the center of the first side surface. As a result, it may be possible to obtain sufficient space where the second pad portions 141, 142 and 143 bonded to the first flexible printed circuit boards SFPC1 may be disposed.

As shown in FIG. 6, the first pad portions 131a, 132a and 133a may be extended in the same direction as the direction in which the second pad portions 141, 142 and 143 may be extended.

In some embodiments, the first pad portions 131a, 132a and 133a may be extended in the same direction as the direction in which the third pad portions 131b, 132b and 133b may be extended. In other words, the angles between the direction in which the first pad portions 131a, 132a and 133a may be extended and the direction in which the second pad portions 141, 142 and 143 may be equal to the angles between the direction in which the third pad portions 131b, 132b and 133b may be extended and the second pad portions 141, 142 and 143 may be extended.

Referring to FIG. 7, a first adhesive member AM1 may be disposed between the first contact pads CP1 and the second pad portions 141, 142 and 143 of the signal pads. The first adhesive member AM1 may include an anisotropic conductive film.

A part of the first adhesive member AM1 may be disposed on the adjacent third pad portions 131b, 132b and 133b. It is, however, to be understood that the disclosure is not limited thereto.

As described above, the first source driver chips SDIC1 may be disposed on the first flexible printed circuit boards SFPC1, respectively. A second contact pad CP2 that may be spaced apart from the first contact pads CP1 may be further disposed with the first source driver chip SDIC1 therebetween in the direction in which the first flexible printed circuit board SFPC1 may be extended.

The second contact pad CP2 may be electrically connected to a third contact pad CP3 of the first driving circuit board SPCB1 through a second adhesive member AM2. The second adhesive member AM2 may be disposed between the second contact pad CP2 and the third contact pad CP3. The second adhesive member AM2 may include an anisotropic conductive film.

As described above, in the display device 1 according to an embodiment, the second width W2 of the second pad portions 141, 142 and 143 bonded to the first contact pads CP1 of the first flexible printed circuit board SFPC1 may be greater than the first width W1 of the first pad portions 131a, 132a and 133a to be connected to the first connection lines 115, so that a bonding force with the first contact pads CP1 may be increased. As a result, it may be possible to prevent connection failure.

The first signal pad may have a first angle θ1 between the direction in which the second pad portion 141 may be extended and the direction in which the third pad portion 131b may be extended. The second signal pad may have a second angle θ2 between the direction in which the second pad portion 142 may be extended and the direction in which the third pad portion 132b may be extended. The third signal pad may have a third angle θ3 between the direction in which the second pad portion 143 may be extended and the direction in which the third pad portion 133b may be extended. The first angle θ1 may be greater than the second angle θ2 and the third angle θ3, and the third angle θ3 may have a value between the first angle θ1 and the second angle θ2.

For the signal pads disposed on the first side surface of the first substrate 100, the spacing distances between the second pad portions 141, 142 and 143 bonded to the first flexible printed circuit board SFPC1 and the first pad portions 131a, 132a and 133a in the first direction DR1 may increase toward the edge from the center of the first side surface. As a result, it may be possible to obtain sufficient space where the second pad portions 141, 142 and 143 bonded to the first flexible printed circuit boards SFPC1 may be disposed.

Figure 8:
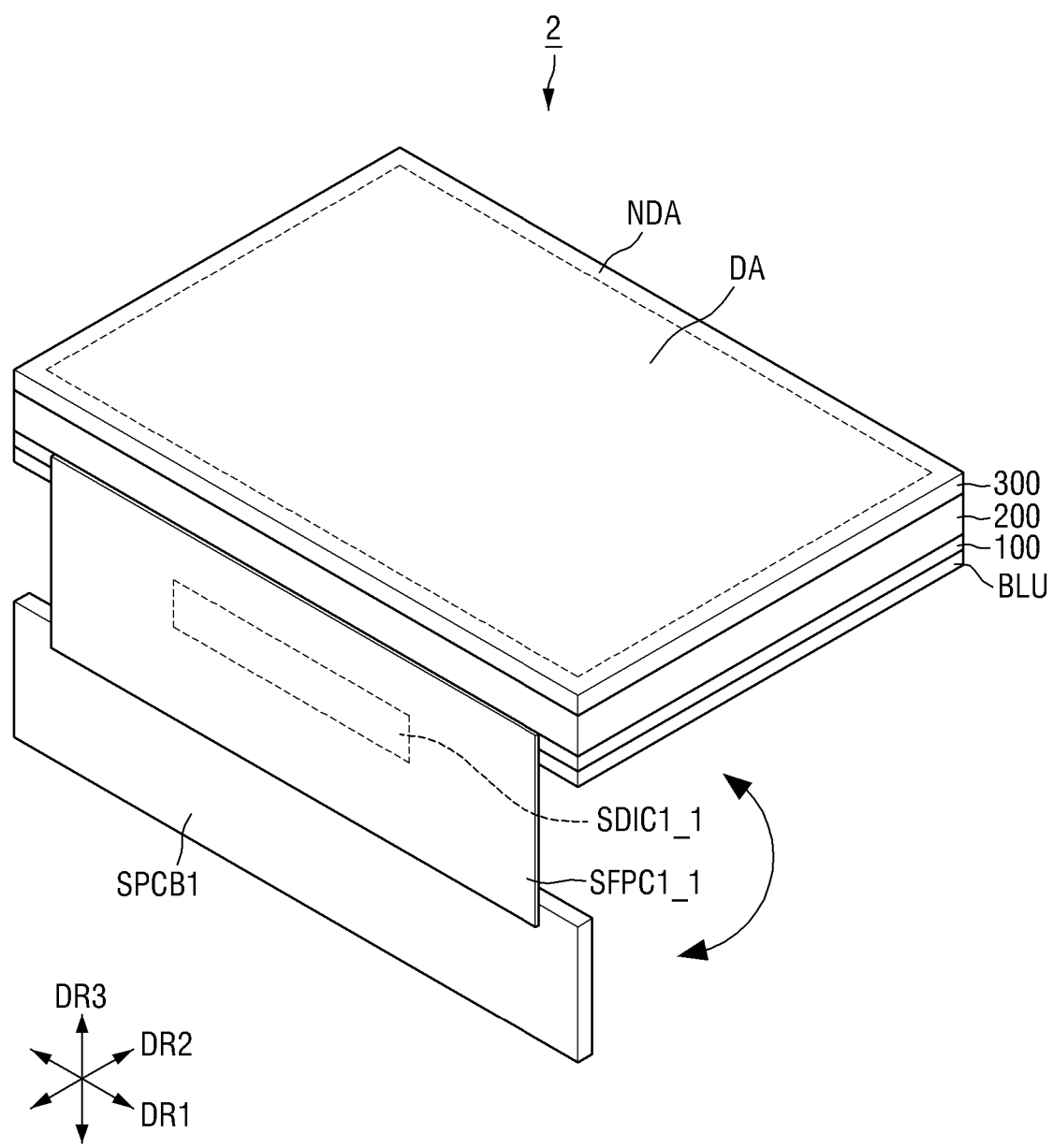
FIG. 8 is a schematic perspective view of a display device according to another embodiment of the disclosure.

FIG. 8 is a schematic perspective view of a display device according to another embodiment of the disclosure.

Referring to FIG. 8, a display device 2 according to an embodiment may be different from the display device 1 according to the above embodiment in that a first flexible printed circuit board SFPC1_1 may be formed in a single piece.

More specifically, in the display device 2, the first flexible printed circuit board SFPC1_1 may be implemented as a single element.

A first source driver chip SDIC1_1 may be disposed on a first flexible printed circuit board SFPC1_1. Although one first source driver chip SDIC1_1 may be disposed on the first flexible printed circuit board SFPC1_1 in the example shown in FIG. 8, the disclosure is not limited thereto. More than one first source driver chips SDIC1_1 may be disposed.

In the display device 2 according to an embodiment, the second widths W2 of second pad portions 141, 142 and 143 bonded to the first contact pad CP1 of the first flexible printed circuit board SFPC1_1 may be greater than first widths W1 of the first pad portions 131a, 132a and 133a to be connected to the first connection lines 115, so that a bonding force with the first contact pad CP1 may be increased. As a result, it may be possible to prevent connection failure.

The first signal pad may have a first angle θ1 between the direction in which the second pad portion 141 may be extended and the direction in which a third pad portion 131b may be extended. The second signal pad may have a second angle θ2 between the direction in which the second pad portion 142 may be extended and the direction in which a third pad portion 132b may be extended. The third signal pad may have a third angle θ3 between the direction in which the second pad portion 143 may be extended and the direction in which a third pad portion 133b may be extended. The first angle θ1 may be greater than the second angle θ2 and the third angle θ3, and the third angle θ3 may have a value between the first angle θ1 and the second angle θ2.

For the signal pads disposed on the first side surface of the first substrate 100, the spacing distances between the second pad portions 141, 142 and 143 bonded to the first flexible printed circuit board SFPC1_1 and the first pad portions 131a, 132a and 133a in the first direction DR1 may increase toward the edge from the center of the first side surface. As a result, it may be possible to obtain sufficient space where the second pad portions 141, 142 and 143 bonded to the first flexible printed circuit board SFPC1_1 may be disposed.

Figure 9:
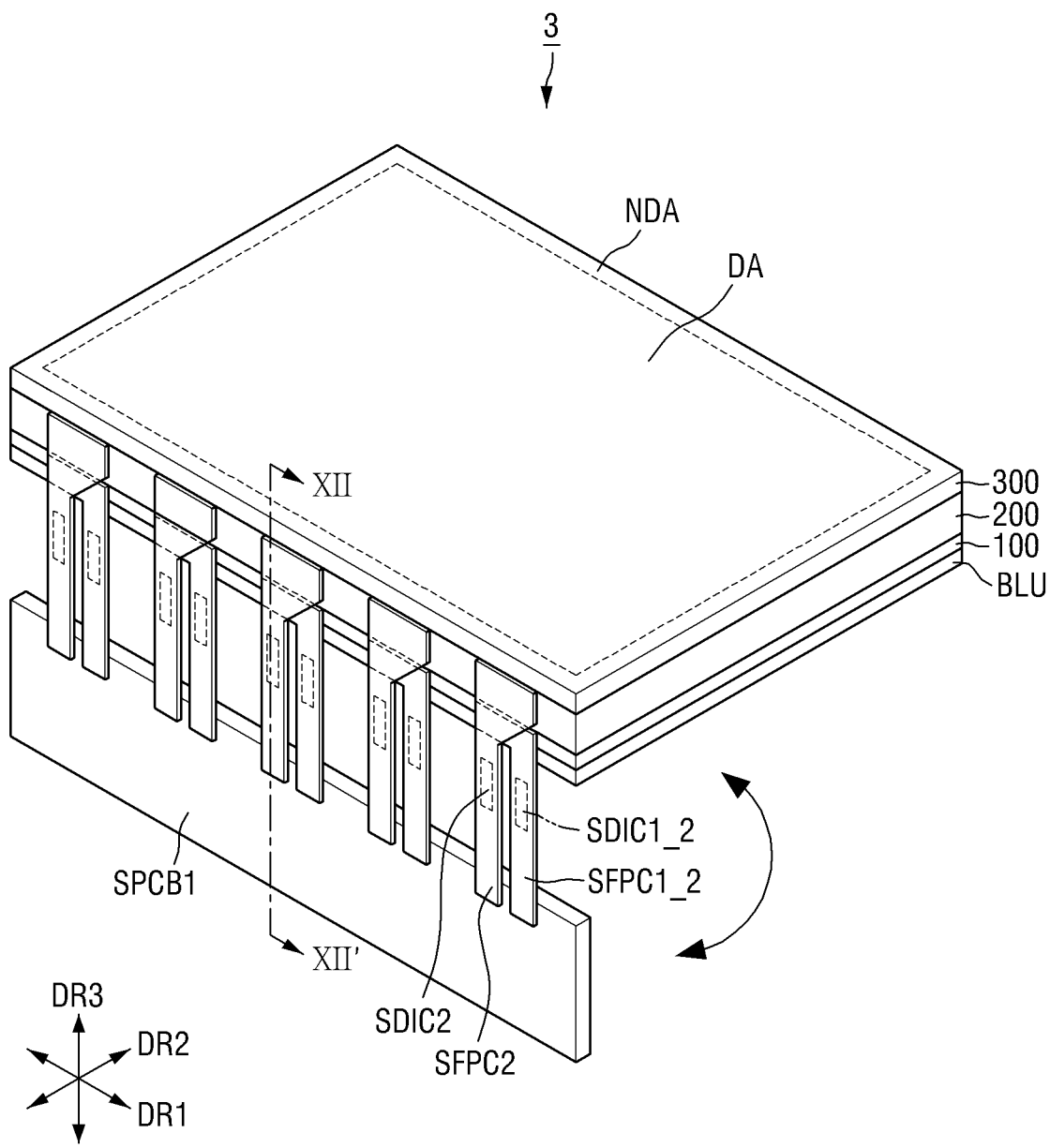
FIG. 9 is a schematic perspective view of a display device according to yet another embodiment of the disclosure.
Figure 10:
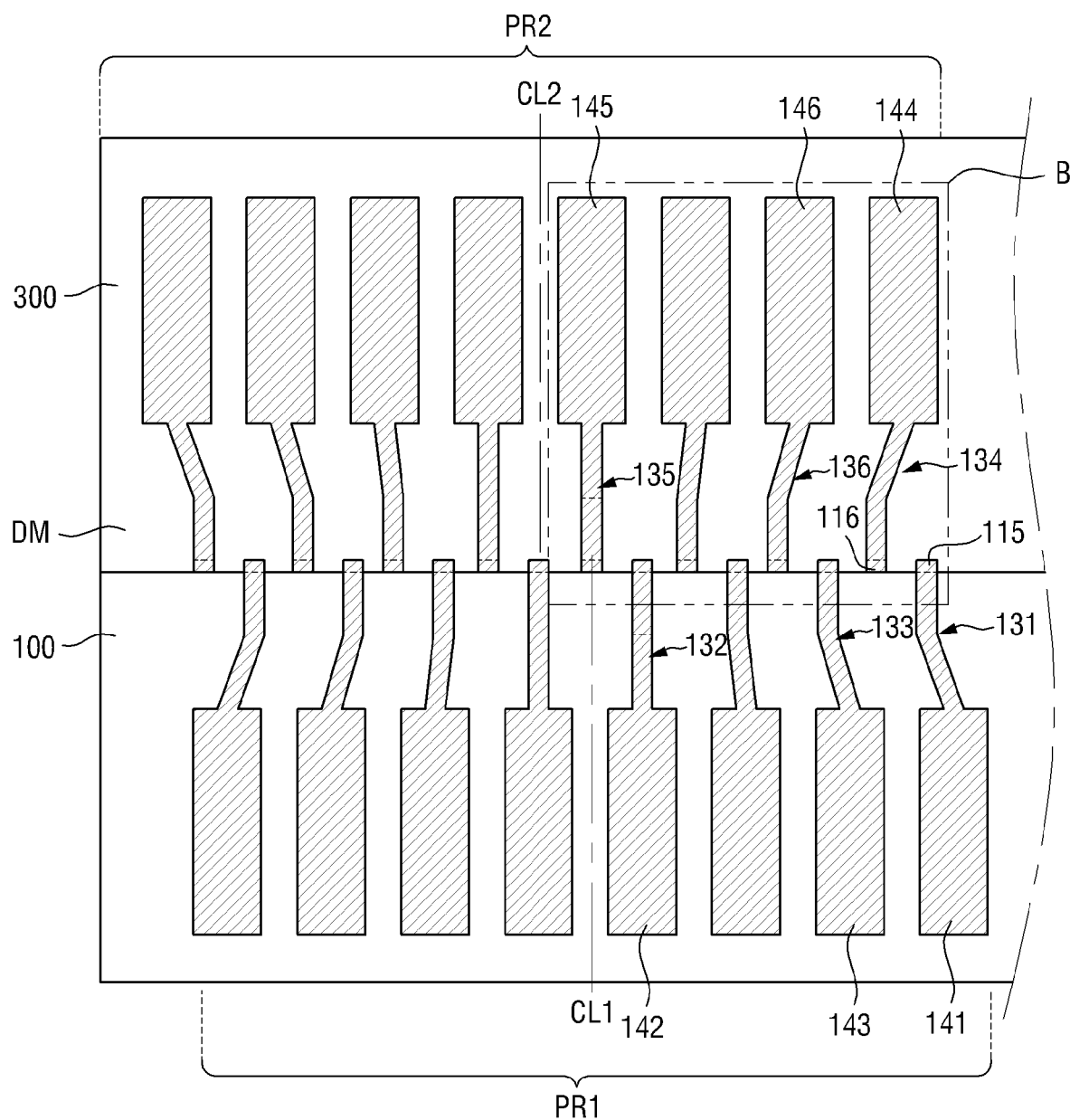
FIG. 10 is a schematic plan view showing a layout of signal pads disposed on a first substrate and a second substrate according to yet another embodiment of the disclosure.
Figure 11:
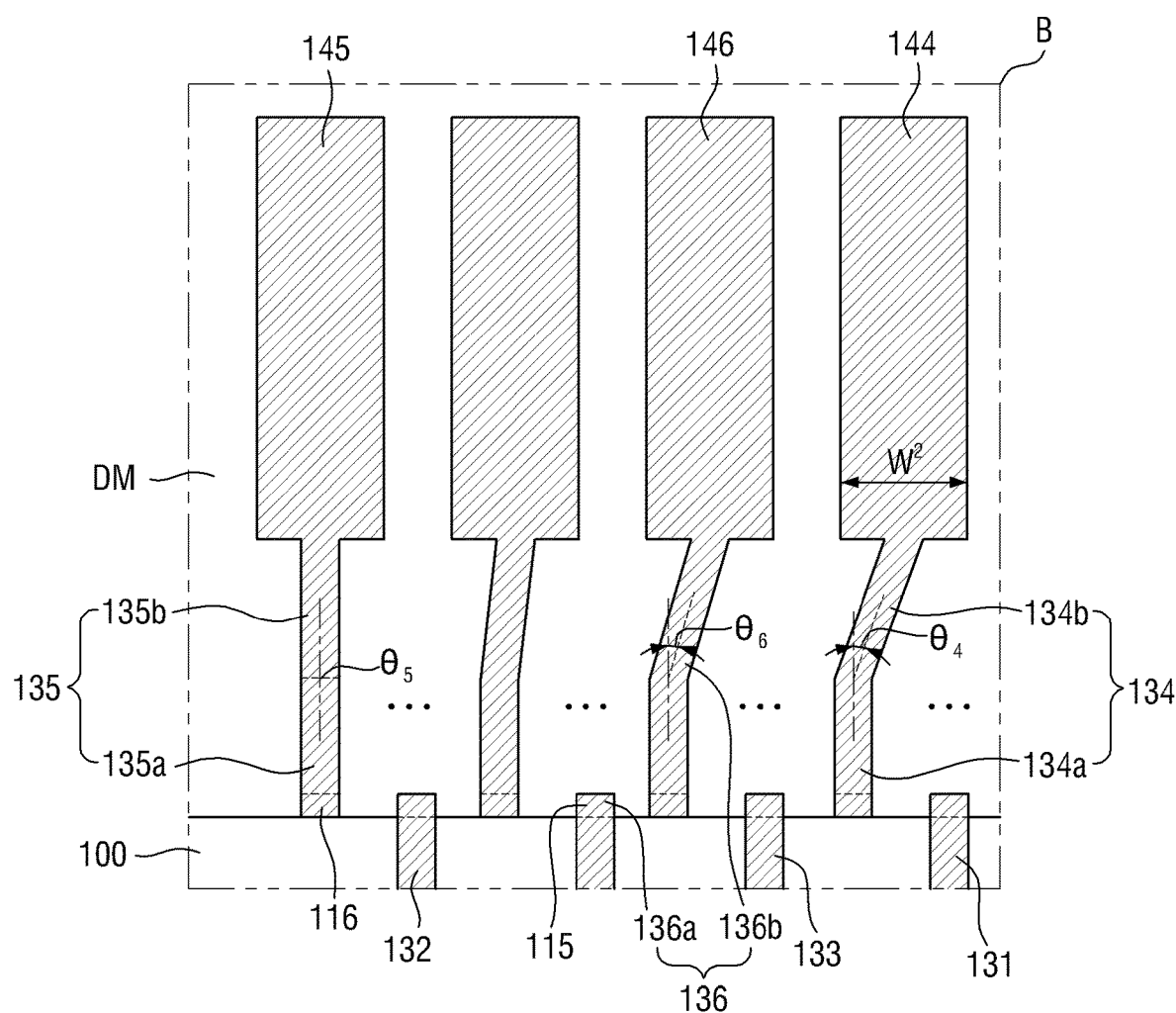
FIG. 11 is an enlarged schematic view of area B of FIG. 10.
Figure 12:
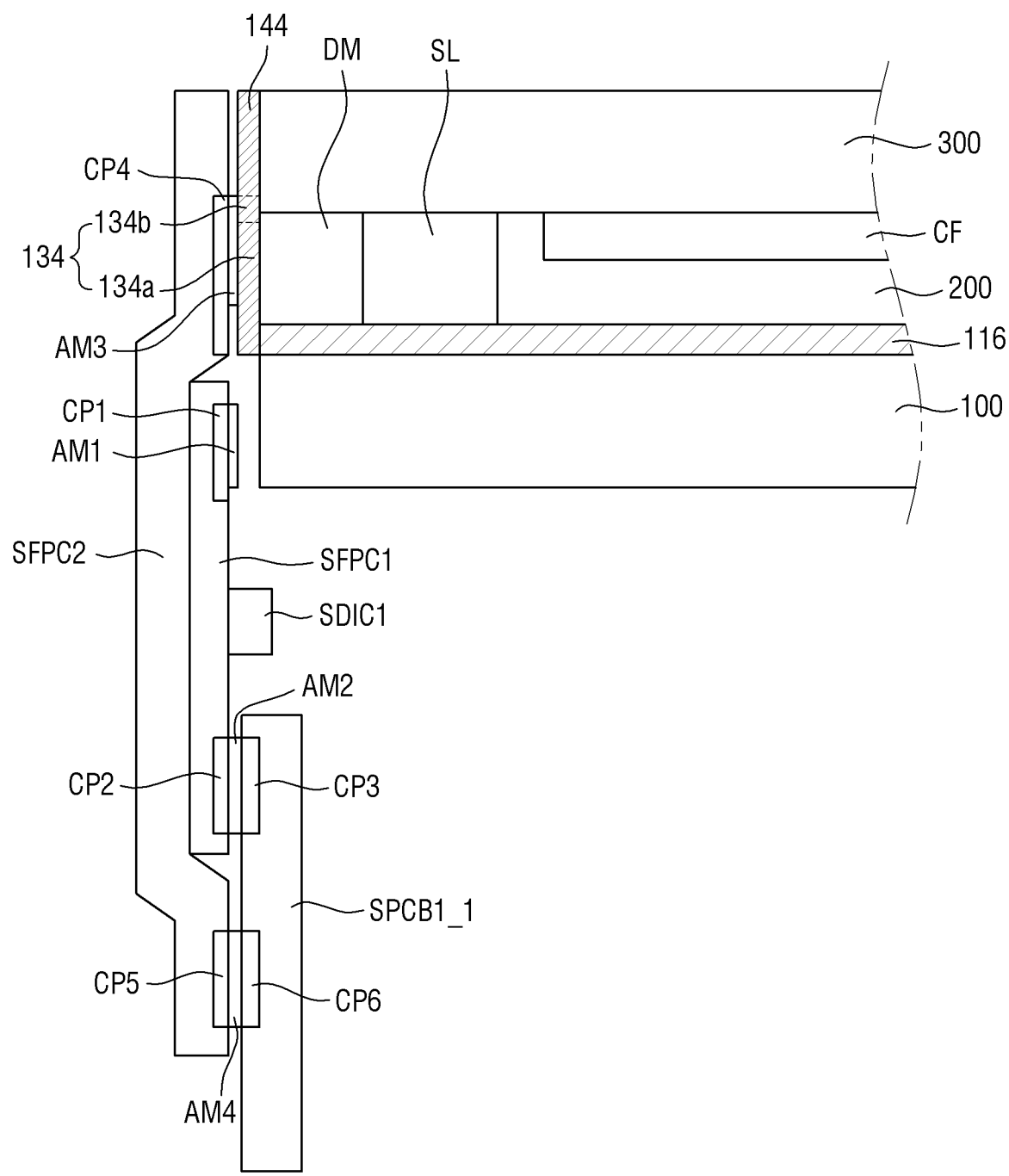
FIG. 12 is a schematic cross-sectional view taken along line XII-XII' of FIG. 9.

FIG. 9 is a schematic perspective view of a display device according to yet another embodiment of the disclosure. FIG. 10 is a schematic plan view showing a layout of signal pads disposed on a first substrate and a second substrate according to yet another embodiment of the disclosure. FIG. 11 is an enlarged schematic view of area B of FIG. 10. FIG. 12 is a schematic cross-sectional view taken along line XII-XII' of FIG. 9.

A display device 3 according to the embodiment shown in FIGS. 9 to 12 may be different from the display device 1 according to the above embodiment in that the display device 3 may further include second connection lines 116 and signal pads connected to the second connection lines 116.

More specifically, second connection lines 116 may be disposed. The second connection wires 116 may be arranged such that they may be spaced apart from one another along the first direction DR1. Each of the second connection lines 116 may be disposed between every two of the first connection lines 115. The second connection lines 116 and the first connection lines 115 may be alternately arranged along the first direction DR1.

The second connection lines 116 may be electrically connected to data lines, respectively. The second connection lines 116 may be extended to the end of the first substrate 100.

The data lines may be electrically connected to the pixels, respectively. Accordingly, the connection lines 116 may be electrically connected to the pixels, respectively. The connection lines 116 may include, but may not be limited to, copper (Cu).

The signal pads connected to the second connection lines 116 may be disposed on a side surface of a dummy pattern DM and on a side surface of the second substrate 300.

The signal pads may be spaced apart from one another along the first direction DR1. The signal pads may form a second signal pad array PR2 arranged along the first direction DR1.

The signal pads may be connected to the second connection lines 116, respectively. As shown in FIG. 12, the signal pads may be connected to the second connection lines 116 through a third adhesive member AM3, respectively. The third adhesive member AM3 may be an anisotropic conductive film.

The signal pads may be disposed in a shape symmetrical with respect to a second virtual line CL2 (an imaginary line extended in the thickness direction) that divides the second signal pad array PR2 into equal halves. In the drawings, a fourth signal pad 134 and 144 may be disposed on the right hand, a fifth signal pad 135 and 145 may be disposed adjacent to the second virtual line CL2, and a sixth signal pad 136 and 146 may be disposed between the fourth signal pad 134 and 144 and the fifth signal pad 135 and 145.

Each of the signal pads may include, but may not be limited to, silver (Ag). The material of the signal pads may include a typical conductive material.

The signal pads may include first pad portions 134a, 135a and 136a connected to the second connection lines 116, respectively; second pad portions 144, 145 and 146 connected to second contact pads CP2 of the second flexible printed circuit boards SFPC2 as shown in FIG. 12; and third pad portions 134b, 135b and 136b disposed between the first pad portions 134a, 135a and 136a, and the second pad portions 144, 145 and 146, respectively, to connect the first pad portions 134a, 135a and 136a and the second pad portions 144, 145 and 146.

The first pad portions 134a, 135a and 136a and the second pad portions 144, 145 and 146 of the signal pads may be extended along the thickness direction (third direction DR3), while the second pad portions 134b, 135b and 136b may be extended in a direction different from the third direction DR3.

Referring to FIG. 11, the first pad portions 134a, 135a and 136a and the third pad portions 134b, 135b and 136b may have a first width W1 in the first direction DR1. The second pad portions 144, 145 and 146 may have a second width W2 in the first direction DR1.

The second width W2 may be greater than the first width W1.

The second pad portions 144, 145 and 146 may be bonded to the fourth contact pad CP4 of the second flexible circuit board SFPC2. In the display device 3 according to an embodiment, the second widths W2 of the second pad portions 144, 145 and 146 bonded to the fourth contact pad CP4 of the second flexible printed circuit boards SFPC2 may be greater than the first widths W1 of the first pad portions 134a, 135a and 136a to be connected to the second connection lines 116, so that a bonding force with the fourth contact pad CP4 may be increased. As a result, it may be possible to prevent connection failure.

Angles between the direction in which the second pad portions 144, 145 and 146 and the first pad portions 134a, 135a and 136a may be extended and the direction in which the third pad portions 134b, 135b and 136b may be extended may be acute angles. The angles between the direction in which the third pad portions 134b, 135b and 136b may be extended and the direction in which the second pad portions 144, 145 and 146 and the first pad portions 134a, 135a and 136a may be extended may decrease toward the second virtual line CL2.

As shown in FIG. 11, the fourth signal pad may have a fourth angle θ4 between the direction in which the second pad portion 144 may be extended and the direction in which the third pad portion 134b may be extended. The fifth signal pad may have a fifth angle θ5 between the direction in which the second pad portion 145 may be extended and the direction in which the third pad portion 135b may be extended. The sixth signal pad may have a sixth angle θ6 between the direction in which the second pad portion 146 may be extended and the direction in which the third pad portion 136b may be extended. The fourth angle θ4 may be greater than the fifth angle θ5 and the sixth angle θ6, and the sixth angle θ6 may have a value between the fourth angle θ4 and the fifth angle θ5.

For example, the fifth angle θ5 may be 0 degrees (i.e., 180 degree opposite angle). The second pad portion 145 and the third pad portion 135b may be extended in a line shape or a straight line shape.

For the signal pads disposed on the second side surface of the second substrate 300 and on the side surface of the dummy pattern DM, the spacing distances between the second pad portions 144, 145 and 146 bonded to the second flexible printed circuit boards SFPC2 and the first pad portions 134a, 135a and 136a in the first direction DR1 may increase toward the edge from the center of the second side surface. As a result, it may be possible to obtain sufficient space where the fifth pad portions 144, 145 and 146 bonded to the second flexible printed circuit boards SFPC2 may be disposed.

As shown in FIG. 11, the first pad portions 134a, 135a and 136a may be extended in the same direction as the direction in which the second pad portions 144, 145 and 146 may be extended.

In some embodiments, the first pad portions 134a, 135a and 136a may be extended in the same direction as the direction in which the third pad portions 134b, 135b and 136b may be extended. In other words, the angles between the direction in which the first pad portions 134a, 135a and 136a may be extended and the direction in which the second pad portions 144, 145 and 146 may be equal to the angles between the direction in which the third pad portions 134b, 135b and 136b may be extended and the second pad portions 144, 145 and 146 may be extended.

Referring to FIG. 12, the third adhesive member AM3 may be disposed between the fourth contact pad CP4 and the second pad portions 144, 145 and 146 of the signal pads. The third adhesive member AM3 may include an anisotropic conductive film.

A part of the third adhesive member AM3 may be disposed on the adjacent third pad portions 134b, 135b and 136b. It is, however, to be understood that the disclosure is not limited thereto.

A second source driver chip SDIC2 may be disposed on the second flexible printed circuit boards SFPC2. A fifth contact pad CP5 spaced apart from the fourth contact pad CP4 may be further disposed with the second source driver chip SDIC2 therebetween in the direction in which the second flexible printed circuit boards SFPC2 may be extended.

The fifth contact pad CP5 may be electrically connected to a sixth contact pad CP6 of the first driving circuit board SPCB1_1 through a fourth adhesive member AM4. The fourth adhesive member AM4 may be disposed between the fifth contact pad CP5 and the sixth contact pad CP6. The fourth adhesive member AM4 may include an anisotropic conductive film.

In the display device 3 according to an embodiment, the second widths W2 of the second pad portions 144, 145 and 146 bonded to the fourth contact pad CP4 of the second flexible printed circuit boards SFPC2 may be greater than the first widths W1 of the first pad portions 134a, 135a and 136a to be connected to the second connection lines 116, so that a bonding force with the fourth contact pad CP4 may be increased. As a result, it may be possible to prevent connection failure.

The fourth signal pad may have a fourth angle θ4 between the direction in which the second pad portion 144 may be extended and the direction in which the third pad portion 134b may be extended. The fifth signal pad may have a fifth angle θ5 between the direction in which the second pad portion 145 may be extended and the direction in which the third pad portion 135b may be extended. The sixth signal pad may have a sixth angle θ6 between the direction in which the second pad portion 146 may be extended and the direction in which the third pad portion 136b may be extended. The fourth angle θ4 may be greater than the fifth angle θ5 and the sixth angle θ6, and the sixth angle θ6 may have a value between the fourth angle θ4 and the fifth angle θ5.

For the signal pads disposed on the second side surface of the second substrate 300 and on the side surface of the dummy pattern DM, the spacing distances between the second pad portions 144, 145 and 146 bonded to the second flexible printed circuit boards SFPC2 and the first pad portions 134a, 135a and 136a in the first direction DR1 may increase toward the edge from the center of the second side surface. As a result, it may be possible to obtain sufficient space where the fifth pad portions 144, 145 and 146 bonded to the second flexible printed circuit boards SFPC2 may be disposed.

As shown in FIGS. 9 and 12, the first flexible printed circuit boards SFPC1_2 and the second flexible printed circuit boards SFPC2 may partially overlap each other. As shown in FIG. 9, the first flexible printed circuit boards SFPC1_2 and the second flexible printed circuit boards SFPC2 may overlap each other on the side surfaces of the first substrate 100 and the second substrate 300 in the direction toward the first substrate 100. However, they may not overlap each other on the first driving circuit board SPCB1 and the end of the first flexible printed circuit boards SFPC1_2 and the end of the second flexible printed circuit boards SFPC2 may be attached to the first driving circuit board SPCB1 separately.

Figure 13:
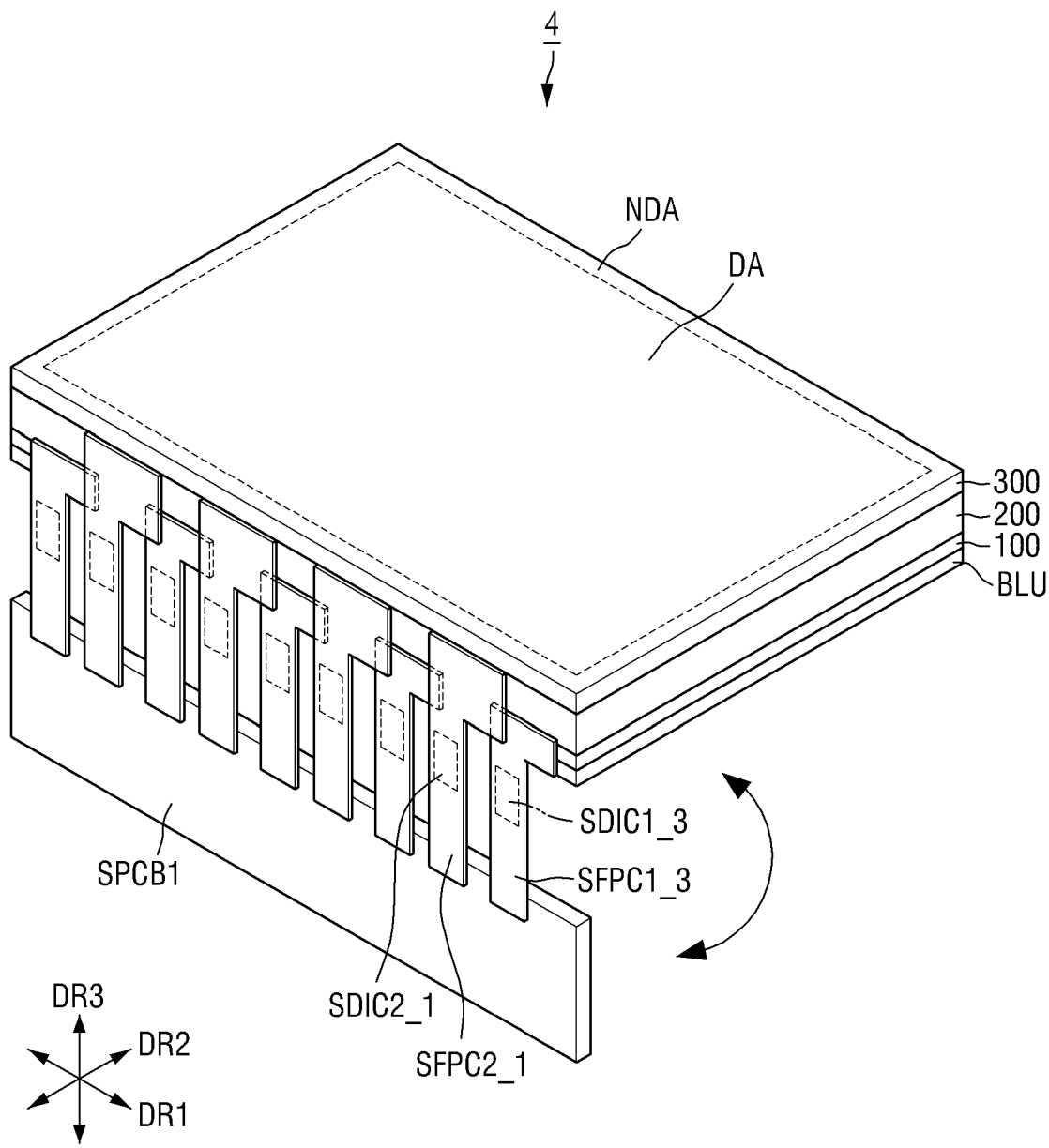
FIG. 13 is a schematic perspective view of a display device according to yet another embodiment of the disclosure.
Figure 14:
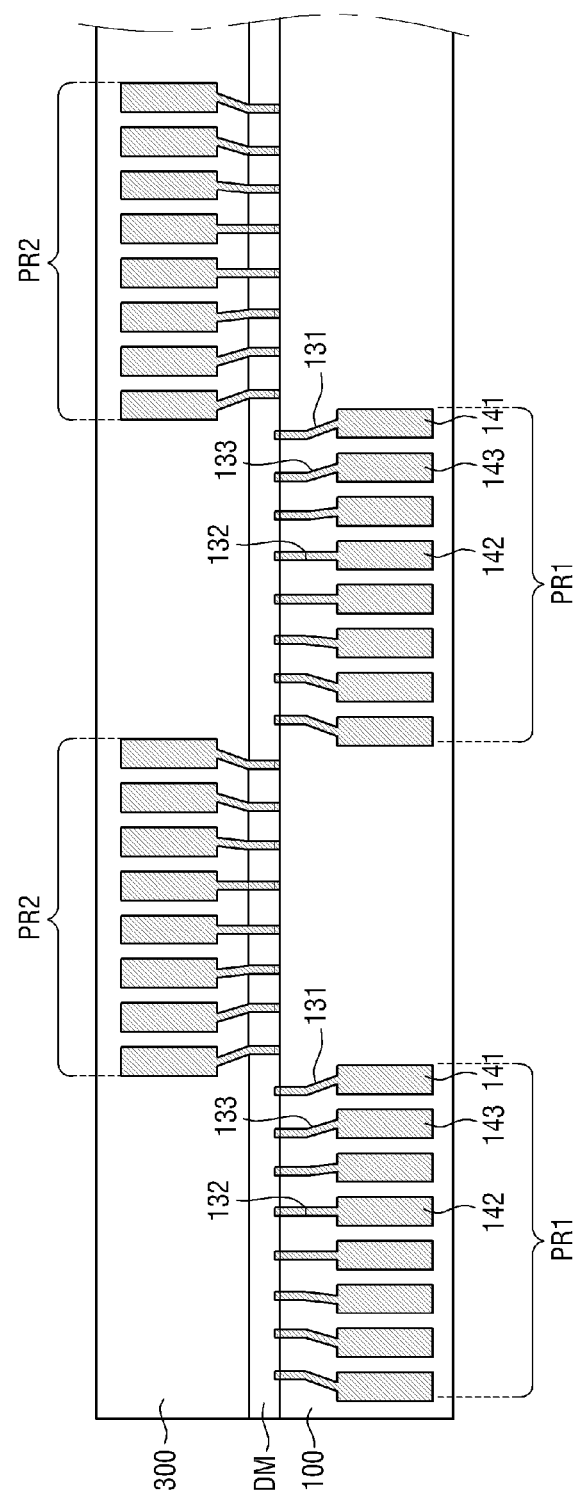
FIG. 14 is a schematic plan view showing a layout of signal pads disposed on a first substrate and a second substrate according to yet another embodiment of the disclosure.

FIG. 13 is a schematic perspective view of a display device according to yet another embodiment of the disclosure. FIG. 14 is a schematic plan view showing a layout of signal pads disposed on a first substrate and a second substrate according to yet another embodiment of the disclosure.

A display device 4 according to the embodiment shown in FIGS. 13 and 14 may be different from the display device 3 according to the embodiment shown in FIGS. 9 to 12 in that first signal pad arrays PR1 and second signal pad arrays PR2, such as those described above, may be arranged alternately in the first direction DR1.

More specifically, first flexible printed circuit boards SFPC1_3 may be disposed on the first signal pad arrays PR1, respectively, and second flexible printed circuit boards SFPC2_1 may be disposed on the second signal pad arrays PR2, respectively. The second flexible printed circuit boards SFPC2_1 and the first flexible printed circuit boards SFPC1_3 may be alternately arranged along the first direction DR1, and each of the second flexible printed circuit boards SFPC2_1 may be disposed between every two of the first flexible printed circuit boards SFPC1_3.

The second flexible printed circuit boards SFPC2_1 and the first flexible printed circuit boards SFPC1_3 may partially overlap each other in the direction toward the first substrate 100, but the disclosure is not limited thereto.

First source driver chips SDIC1_3 may be disposed on the first flexible printed circuit boards SFPC1_3, respectively, and second source driver chips SDIC2_1 may be disposed on the second flexible printed circuit boards SFPC2_1, respectively.

In the display device 4 according to an embodiment, the second widths W2 of the second pad portions 141, 142 and 143 bonded to the first contact pads CP1 of the first flexible printed circuit boards SFPC1_3 may be greater than the first widths W1 of the first pad portions 131a, 132a and 133a to be connected to the first connection lines 115, so that a bonding force with the first contact pad CP1 may be increased. As a result, it may be possible to prevent the connection failure.

The first signal pad may have a first angle θ1 between the direction in which the second pad portion 141 may be extended and the direction in which the third pad portion 131b may be extended. The second signal pad may have a second angle θ2 between the direction in which the second pad portion 142 may be extended and the direction in which the third pad portion 132b may be extended. The third signal pad may have a third angle θ3 between the direction in which the second pad portion 143 may be extended and the direction in which the third pad portion 133b may be extended. The first angle θ1 may be greater than the second angle θ2 and the third angle θ3, and the third angle θ3 may have a value between the first angle θ1 and the second angle θ2.

For the signal pads disposed on the first side surface of the first substrate 100, the spacing distances between the second pad portions 141, 142 and 143 bonded to the first flexible printed circuit boards SFPC1_3 and the first pad portions 131a, 132a and 133a in the first direction DR1 may increase toward the edge from the center of the first side surface. As a result, it may be possible to obtain sufficient space where the second pad portions 141, 142 and 143 bonded to the first flexible printed circuit board SFPC1_1 may be disposed.

Likewise, the second widths W2 of the second pad portions 144, 145 and 146 bonded to the fourth contact pad CP4 of the second flexible printed circuit boards SFPC2_1 may be greater than the first widths W1 of the first pad portions 134a, 135a and 136a to be connected to the second connection lines 116, so that a bonding force with the fourth contact pad CP4 may be increased. As a result, it may be possible to prevent connection failure.

The fourth signal pad may have a fourth angle θ4 between the direction in which the second pad portion 144 may be extended and the direction in which the third pad portion 134b may be extended. The fifth signal pad may have a fifth angle θ5 between the direction in which the second pad portion 145 may be extended and the direction in which the third pad portion 135b may be extended. The sixth signal pad may have a sixth angle θ6 between the direction in which the second pad portion 146 may be extended and the direction in which the third pad portion 136b may be extended. The fourth angle θ4 may be greater than the fifth angle θ5 and the sixth angle θ6, and the sixth angle θ6 may have a value between the fourth angle θ4 and the fifth angle θ5.

For the signal pads disposed on the second side surface of the second substrate 300 and on the side surface of the dummy pattern DM, the spacing distances between the second pad portions 144, 145 and 146 bonded to the second flexible printed circuit boards SFPC2 and the first pad portions 134a, 135a and 136a in the first direction DR1 may increase toward the edge from the center of the second side surface. As a result, it may be possible to obtain sufficient space where the fifth pad portions 144, 145 and 146 bonded to the second flexible printed circuit boards SFPC2 may be disposed.

Figure 15:
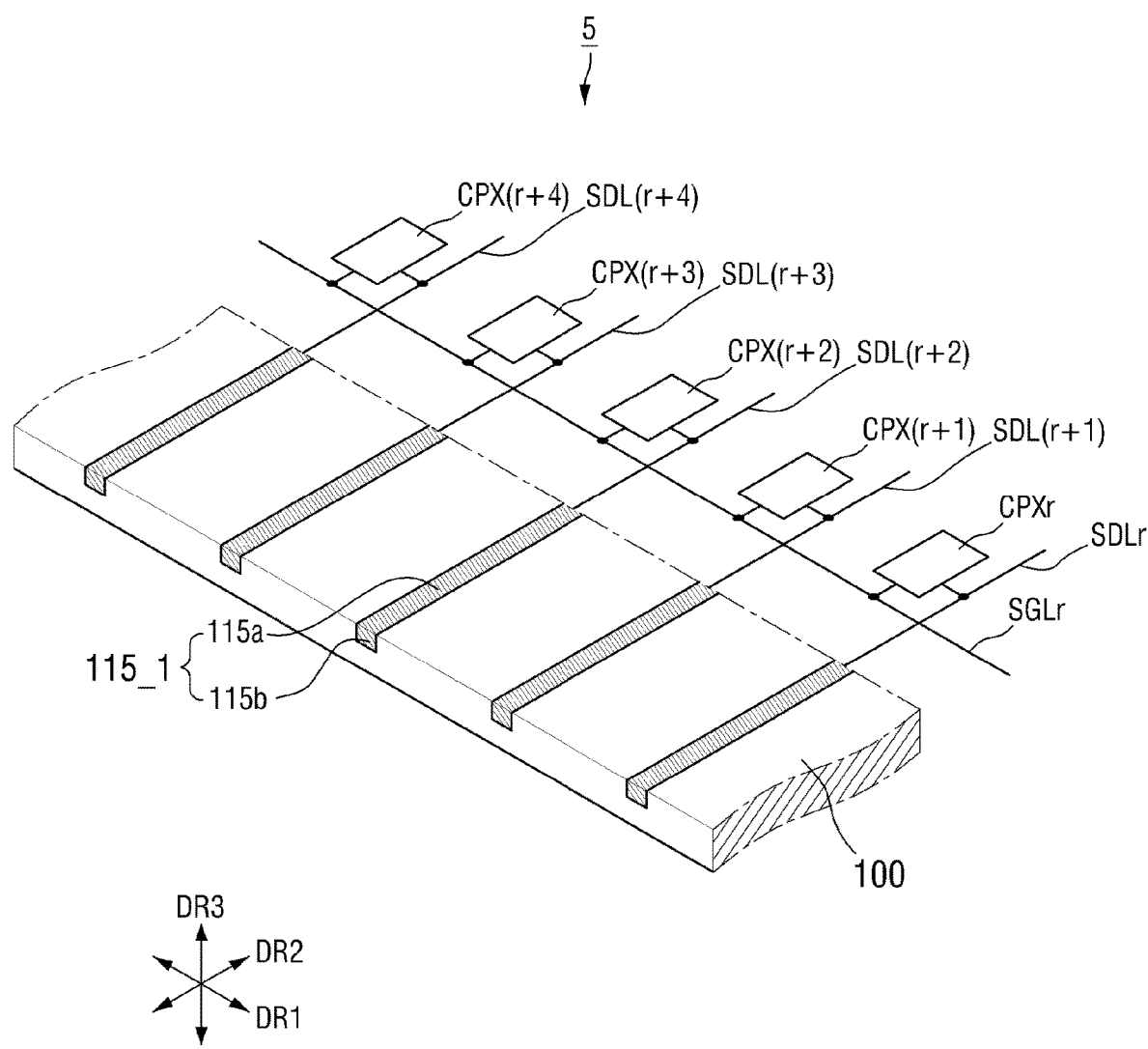
FIG. 15 is a schematic view showing pixels of a first substrate and connection lines connected thereto according to another embodiment.
Figure 16:
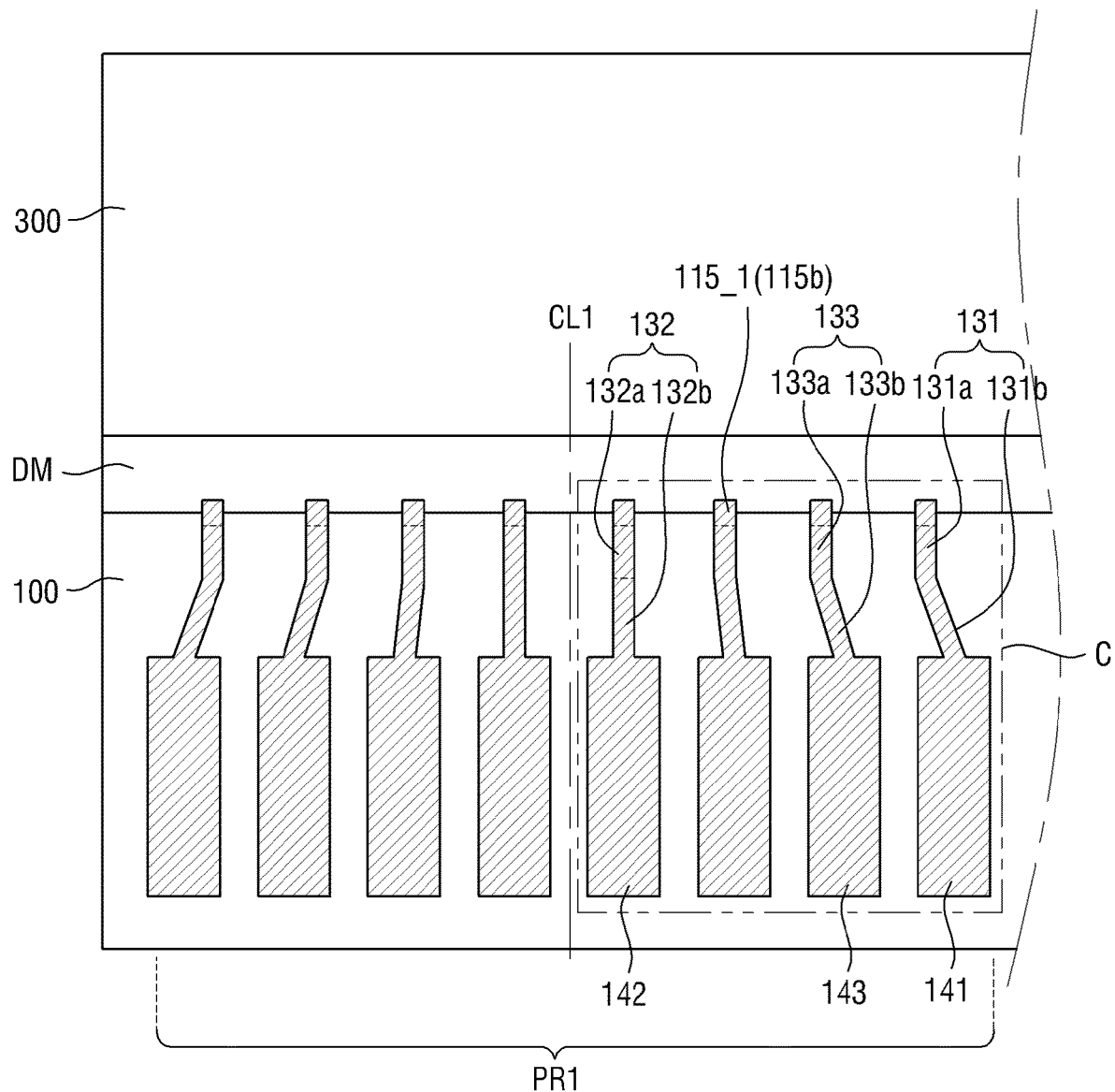
FIG. 16 is a schematic plan view showing a layout of signal pads disposed on a side surface of the first substrate according to yet another embodiment of the disclosure.
Figure 17:
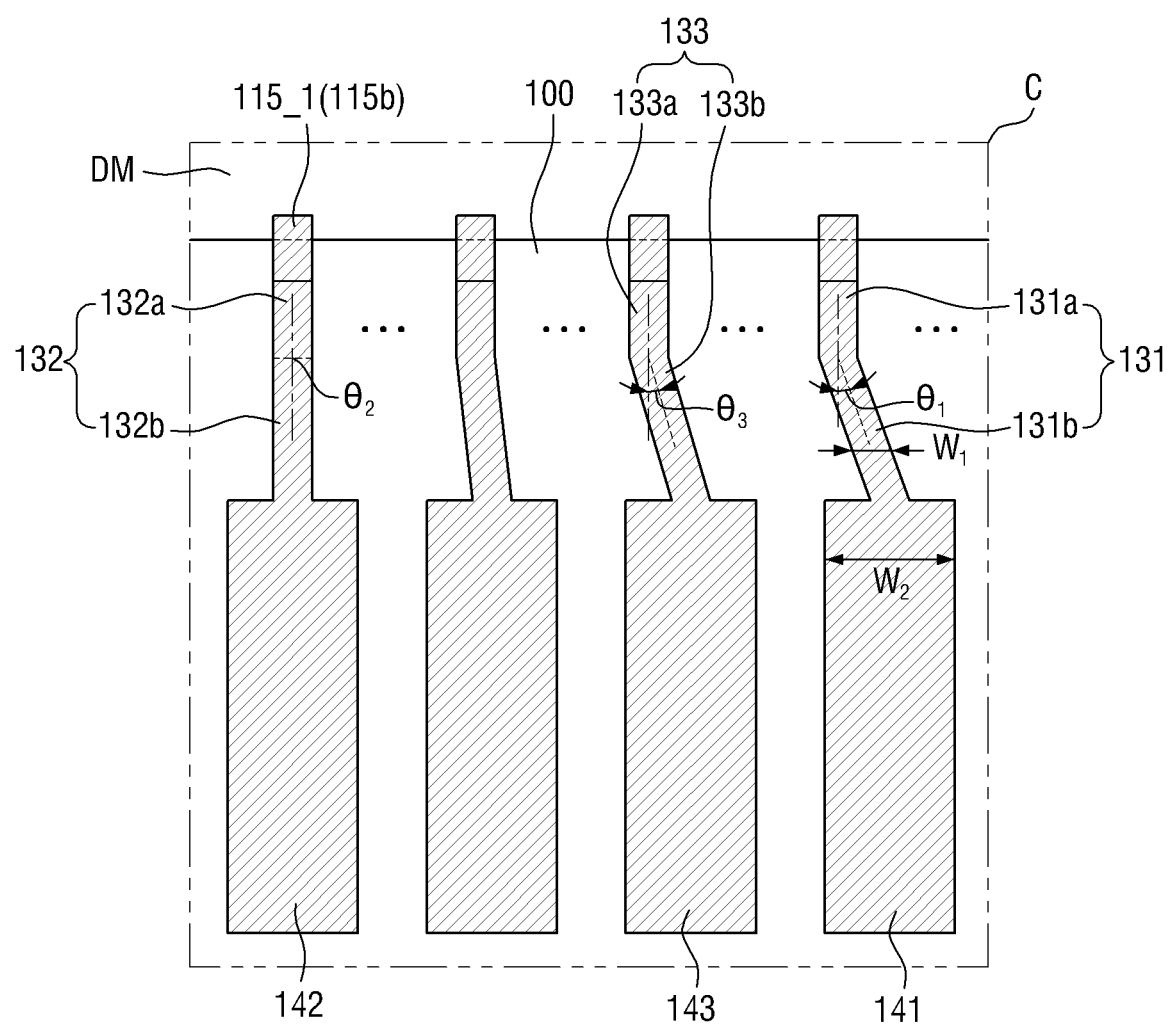
FIG. 17 is an enlarged schematic view of area C of FIG. 16.
Figure 18:
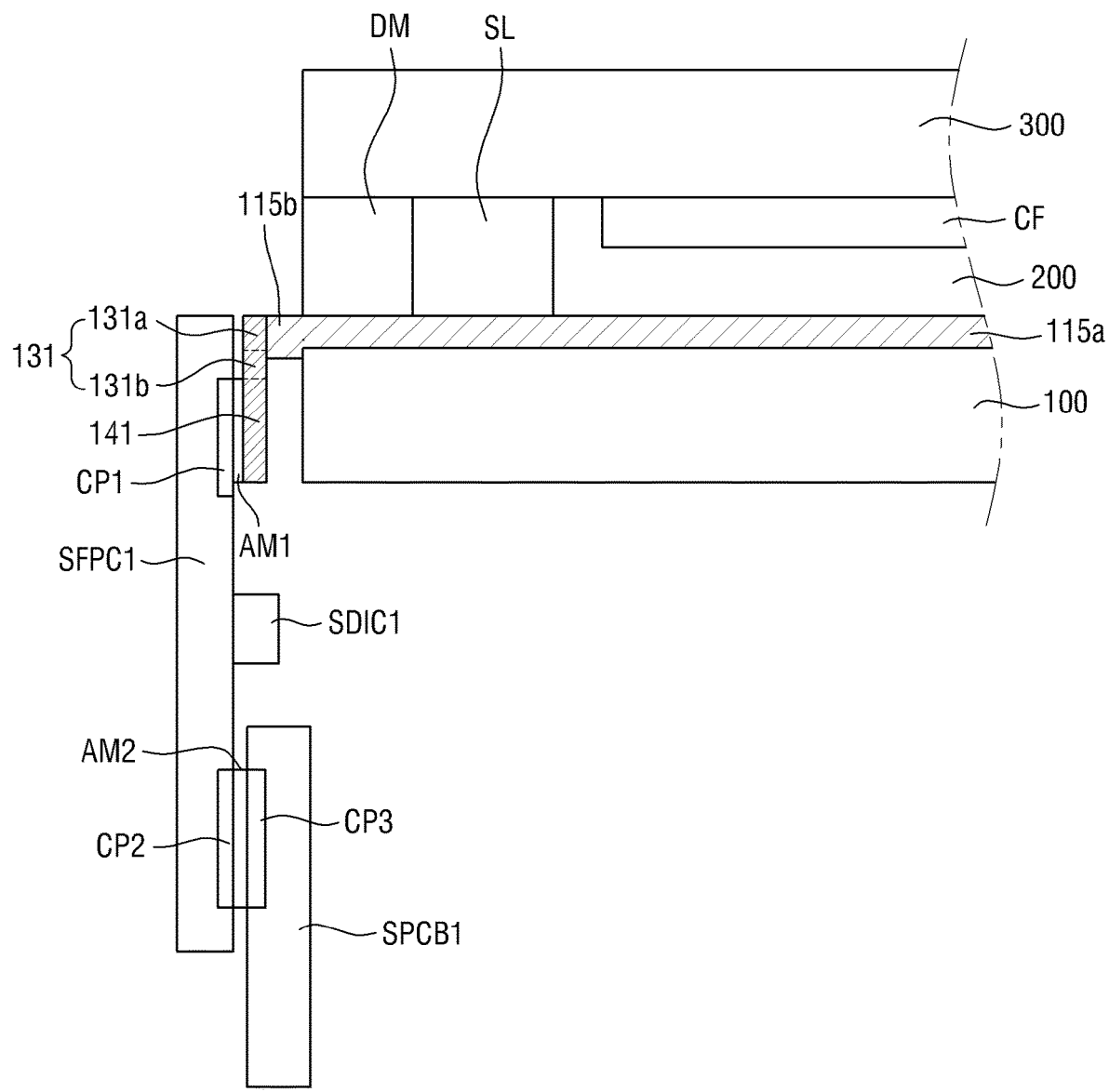
FIG. 18 is a schematic cross-sectional view of a display device according to yet another embodiment of the disclosure.

FIG. 15 is a schematic view showing pixels of a first substrate and connection lines connected thereto according to another embodiment. FIG. 16 is a schematic plan view showing a layout of signal pads disposed on a side surface of the first substrate according to yet another embodiment of the disclosure. FIG. 17 is an enlarged schematic view of area C of FIG. 16. FIG. 18 is a schematic cross-sectional view of a display device according to yet another embodiment of the disclosure.

A display device 5 according to the embodiment shown in FIGS. 15 to 18 may be different from the display device 1 according to the above embodiment in that each of first connection lines 115_1 may include a first line portion 115a disposed on the upper surface of the first substrate 100, and a second line portion 115b connected to the first line portion 115a and disposed on a first side surface of the first substrate 100.

More specifically, in the display device 5 according to this embodiment, each of the first connection lines 115_1 may include the first line portion 115a disposed on the upper surface of the first substrate 100, and the second line portion 115b connected to the first line portion 115a and disposed on the first side surface of the first substrate 100.

Referring to FIGS. 16 and 17, the first pad portions 131a, 132a and 133a may be electrically connected to the second line portions 115b of the first connection lines 115_1. The first pad portions 131a, 132a, and 133a may be connected (e.g., directly) to the second line portions 115b, respectively.

The width of the second line portions 115b in the first direction DR1 may be substantially equal to the first width W1 of the first pad portions 131a, 132a and 133a in the first direction DR1. It is to be understood that width of the second line portions 115b in the first direction DR1 may be larger or less than the first width W1 of the first pad portions 131a, 132a and 133a in the first direction DR1.

In the display device 5 according to this embodiment, the second widths W2 of the second pad portions 141, 142 and 143 bonded to the first contact pads CP1 of the first flexible printed circuit boards SFPC1 may be greater than the first widths W1 of the first pad portions 131a, 132a and 133a connected to the second line portions 115b of the first connection lines 115_1, so that a bonding force with the first contact pad CP1 may be increased. As a result, it may be possible to prevent connection failure.

The first signal pad may have a first angle θ1 between the direction in which the second pad portion 141 may be extended and the direction in which the third pad portion 131b may be extended. The second signal pad may have a second angle θ2 between the direction in which the second pad portion 142 may be extended and the direction in which the third pad portion 132b may be extended. The third signal pad may have a third angle θ3 between the direction in which the second pad portion 143 may be extended and the direction in which the third pad portion 133b may be extended. The first angle θ1 may be greater than the second angle θ2 and the third angle θ3, and the third angle θ3 may have a value between the first angle θ1 and the second angle θ2.

For the signal pads disposed on the first side surface of the first substrate 100, the spacing distances between the second pad portions 141, 142 and 143 bonded to the first flexible printed circuit boards SFPC1 and the first pad portions 131a, 132a and 133a in the first direction DR1 may increase toward the edge from the center of the first side surface. As a result, it may be possible to obtain sufficient space where the second pad portions 141, 142 and 143 bonded to the first flexible printed circuit boards SFPC1 may be disposed.

Figure 19:
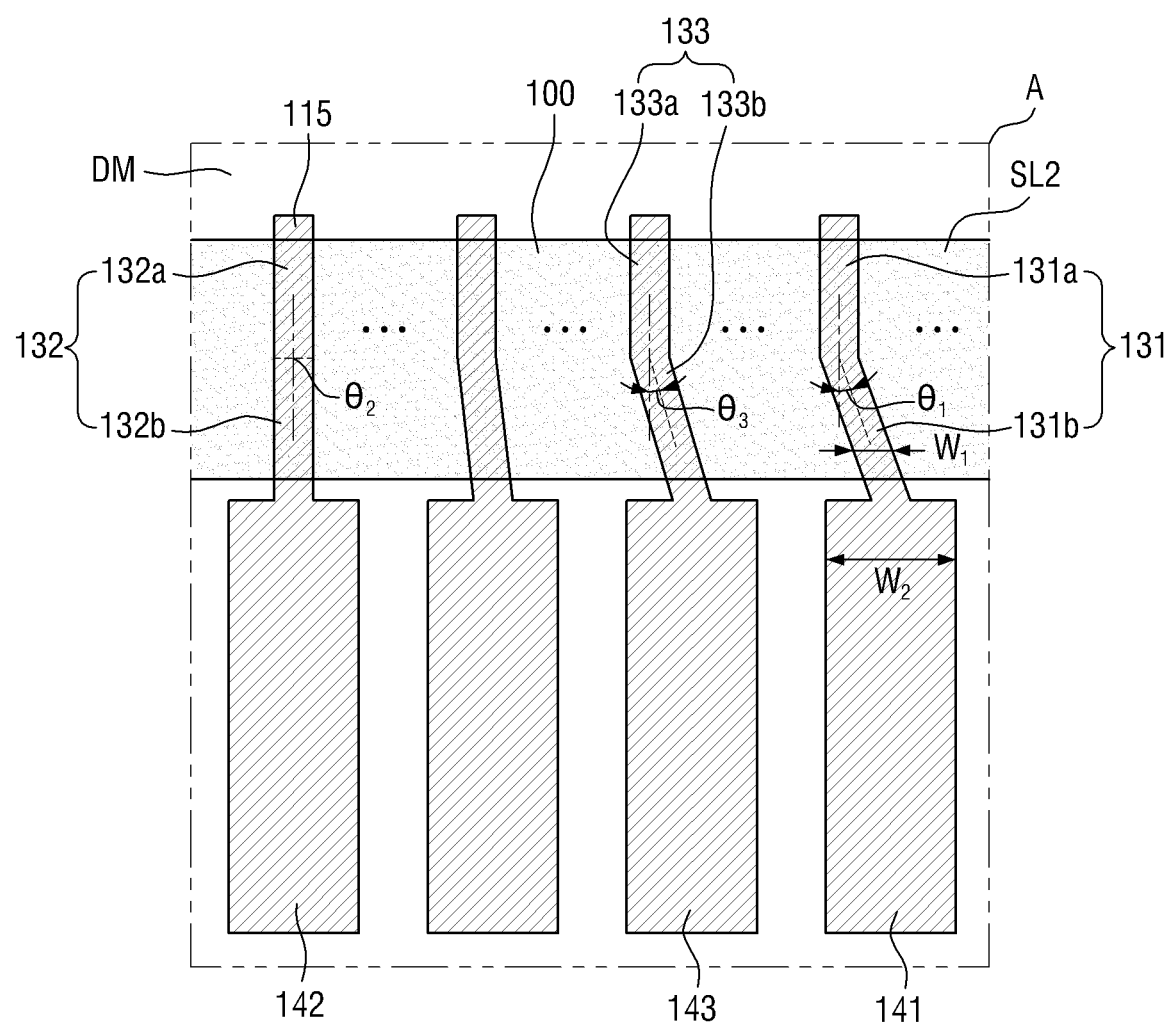
FIG. 19 is a schematic plan view showing a layout of signal pads disposed on a side surface of the first substrate according to yet another embodiment of the disclosure.
Figure 20:
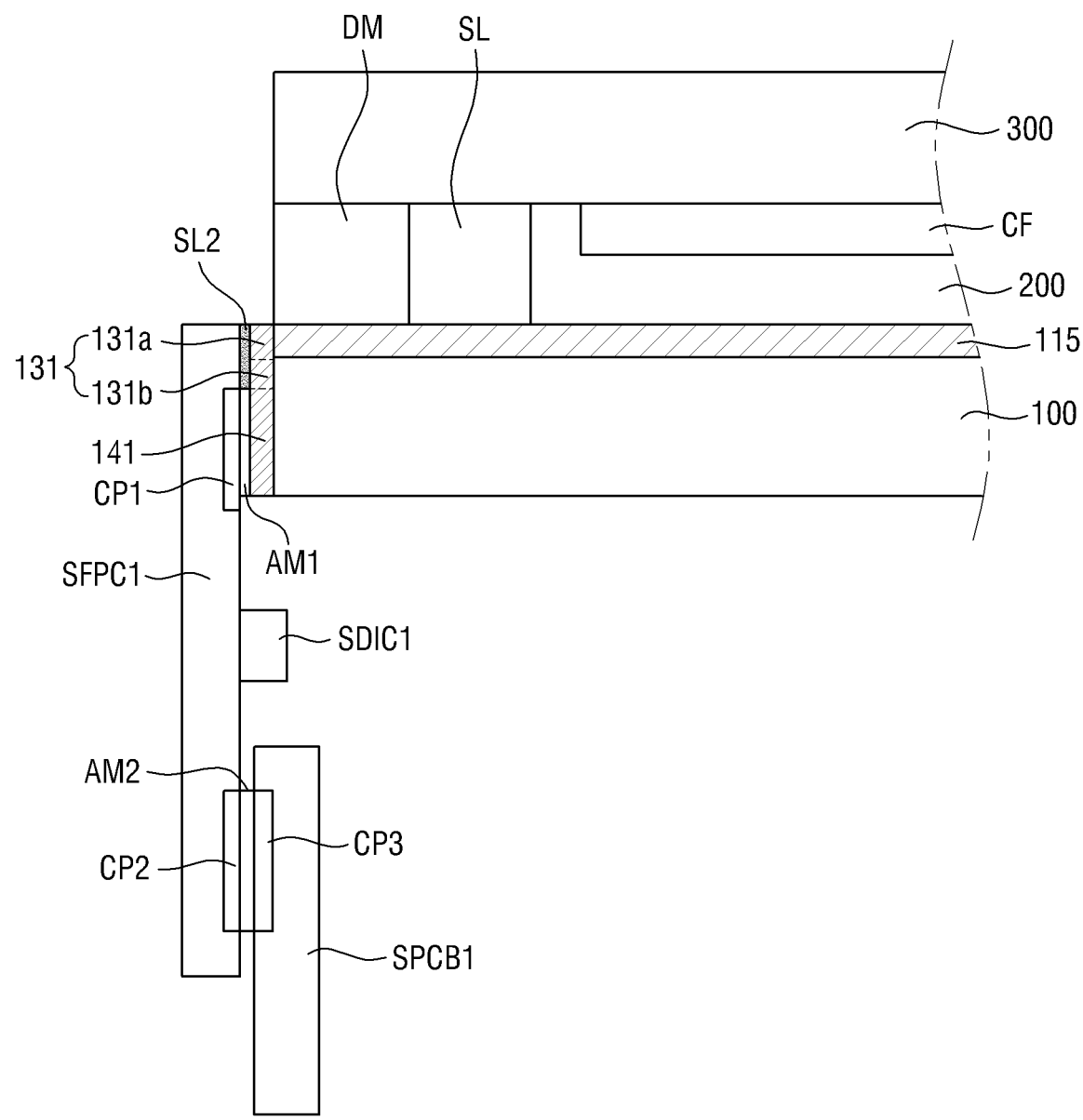
FIG. 20 is a schematic cross-sectional view of a display device according to yet another embodiment of the disclosure.

FIG. 19 is a schematic plan view showing a layout of signal pads disposed on a side surface of the first substrate according to yet another embodiment of the disclosure. FIG. 20 is a schematic cross-sectional view of a display device according to yet another embodiment of the disclosure.

A display device according to the embodiment shown in FIGS. 19 and 20 may be different from the display device 1 according to the above embodiment in that a second sealant SL2 may be further disposed between the signal pads and the first flexible printed circuit board SFPC1.

More specifically, the second sealant SL2 may be disposed such that it overlaps the first pad portions 131a, 132a and 133a in a direction toward the first side surface of the first substrate 100, and may be disposed such that it partially overlaps the third pad portions 131b, 132b and 133b in the direction toward the first side surface of the first substrate 100. It is, however, to be understood that the disclosure is not limited thereto. The second sealant SL2 may completely overlap the third pad portions 131b, 132b and 133b in the direction toward the first side surface of the first substrate 100.

The second sealant SL2 may be disposed between the first pad portions 131a, 132a and 133a and the third pad portions 131b, 132b and 133b of the signal pads and the first flexible printed circuit boards SFPC1.

The second sealant SL2 can prevent the first pad portions 131a, 132a and 133a and the third pad portions 131b, 132b and 133b from peeling off.

Figure 21:
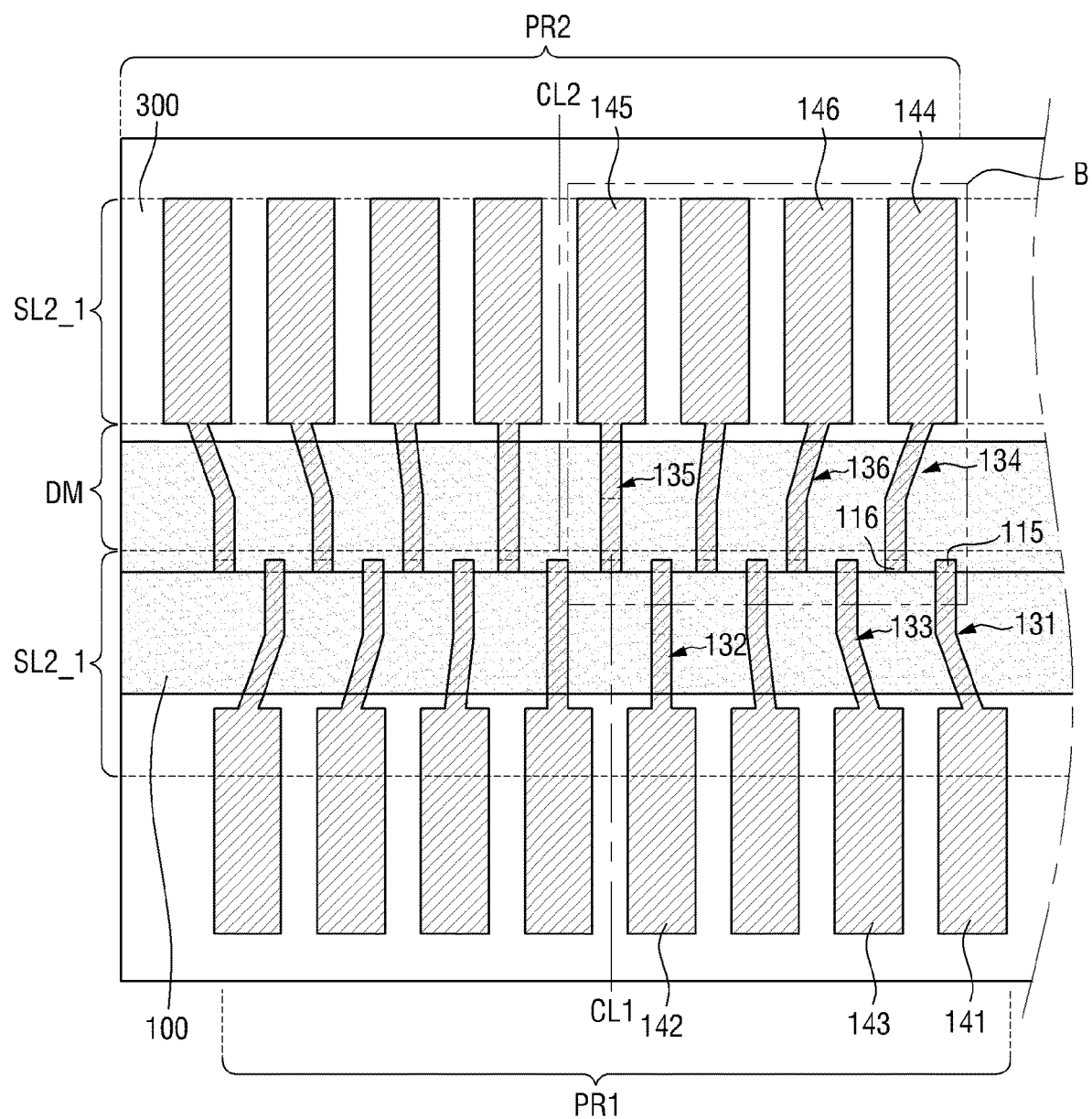
FIG. 21 is a schematic plan view showing a layout of signal pads disposed on a side surface of the first substrate according to yet another embodiment of the disclosure.
Figure 22:
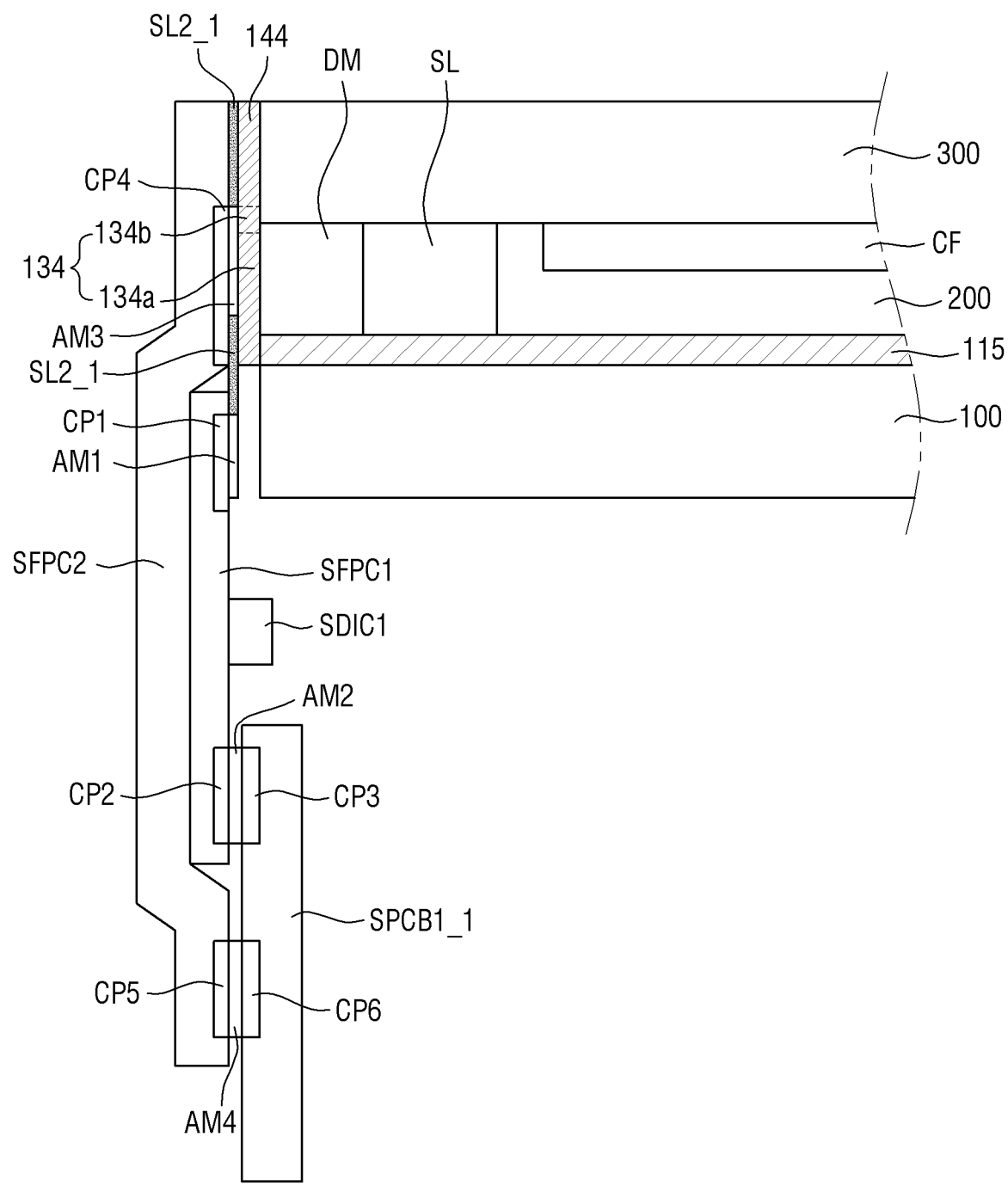
FIG. 22 is a schematic cross-sectional view of a display device according to yet another embodiment of the disclosure.

FIG. 21 is a schematic plan view showing a layout of signal pads disposed on a side surface of the first substrate according to yet another embodiment of the disclosure. FIG. 22 is a schematic cross-sectional view of a display device according to yet another embodiment of the disclosure.

A display device according to the embodiment shown in FIGS. 21 and 22 may be different from the display device 3 shown in FIGS. 9 to 12 and the display device shown in FIGS. 19 and 20 in that a second sealant SL2_1 may be further disposed between the signal pads disposed on a second side surface of the second substrate 300 and the second flexible printed circuit boards SFPC2.

More specifically, the second sealant SL2_1 may be disposed such that it overlaps the first pad portions 131a, 132a and 133a in a direction toward the first side surface of the first substrate 100, and may be disposed such that it partially overlaps the third pad portions 131b, 132b and 133b in the direction toward the first side surface of the first substrate 100. It is, however, to be understood that the disclosure is not limited thereto. The second sealant SL2_1 may completely overlap the third pad portions 131b, 132b and 133b in a direction toward the second side surface of the second substrate 300. The second sealant SL2_1 may be disposed such that it overlaps the first pad portions 134a, 135a and 136a in the direction toward the second side surface of the second substrate 300, and may be disposed such that it partially overlaps the third pad portions 134b, 135b and 136b in the direction toward the second side surface of the second substrate 300. It is, however, to be understood that the disclosure is not limited thereto. The second sealant SL2_1 may completely overlap the third pad portions 134b, 135b and 136b in the direction toward the second side surface of the second substrate 300.

The second sealant SL2_1 may be disposed between the first pad portions 134a, 135a and 136a and the second pad portions 134b, 135b and 136b of the signal pads and the second flexible printed circuit boards SFPC2.

The second sealant SL2_1 can prevent the first pad portions 134a, 135a and 136a and the second pad portions 134b, 135b and 136b from peeling off.

Figure 23:
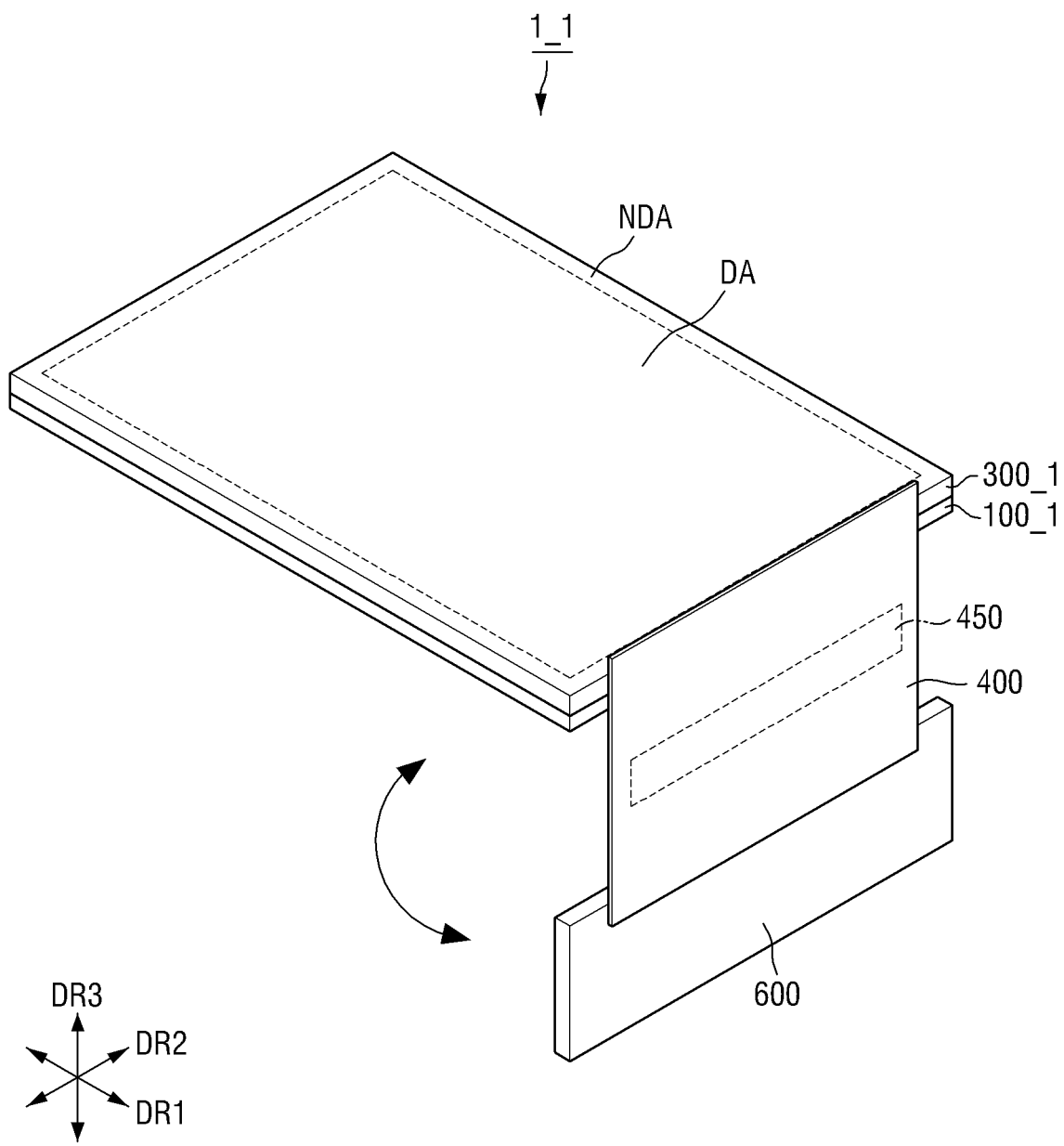
FIG. 23 is a schematic perspective view of a display device according to yet another embodiment of the disclosure.

FIG. 23 is a schematic perspective view of a display device according to yet another embodiment of the disclosure.

The display device according to the embodiment shown in FIG. 23 may be different from the embodiment of FIG. 1 in that an organic light-emitting display device may be employed as the display device.

More specifically, the organic light-emitting display device may include a first substrate 100_1 and a second substrate 300_1 disposed on the first substrate 100_1. A printed circuit board 400 may be disposed on the side surface of an end (e.g., shorter side) of each of the first substrate 100_1 and the second substrate 300_1.

Unlike the display device 1 according to an earlier embodiment, the organic light-emitting display device includes neither a backlight part BLU nor a liquid-crystal layer 200.

Unlike the first substrate 100, the first substrate 100_1 may not include the color filter layers 141, 143 and 145, the lower alignment layer 170 and the second dam DAM2 but may include the common electrode 320. For example, an organic light-emitting layer may be further disposed between the common electrode 320 opposed to the pixel electrode 161 and the pixel electrode 161.

Unlike the second substrate 300, the second substrate 300_1 may not include the common electrode 320, the upper alignment layer 330, and the first dam DAM1. The second substrate 300_1 may be an encapsulation substrate for encapsulating the organic light-emitting layer of the first substrate 100_1.

Figure 24:
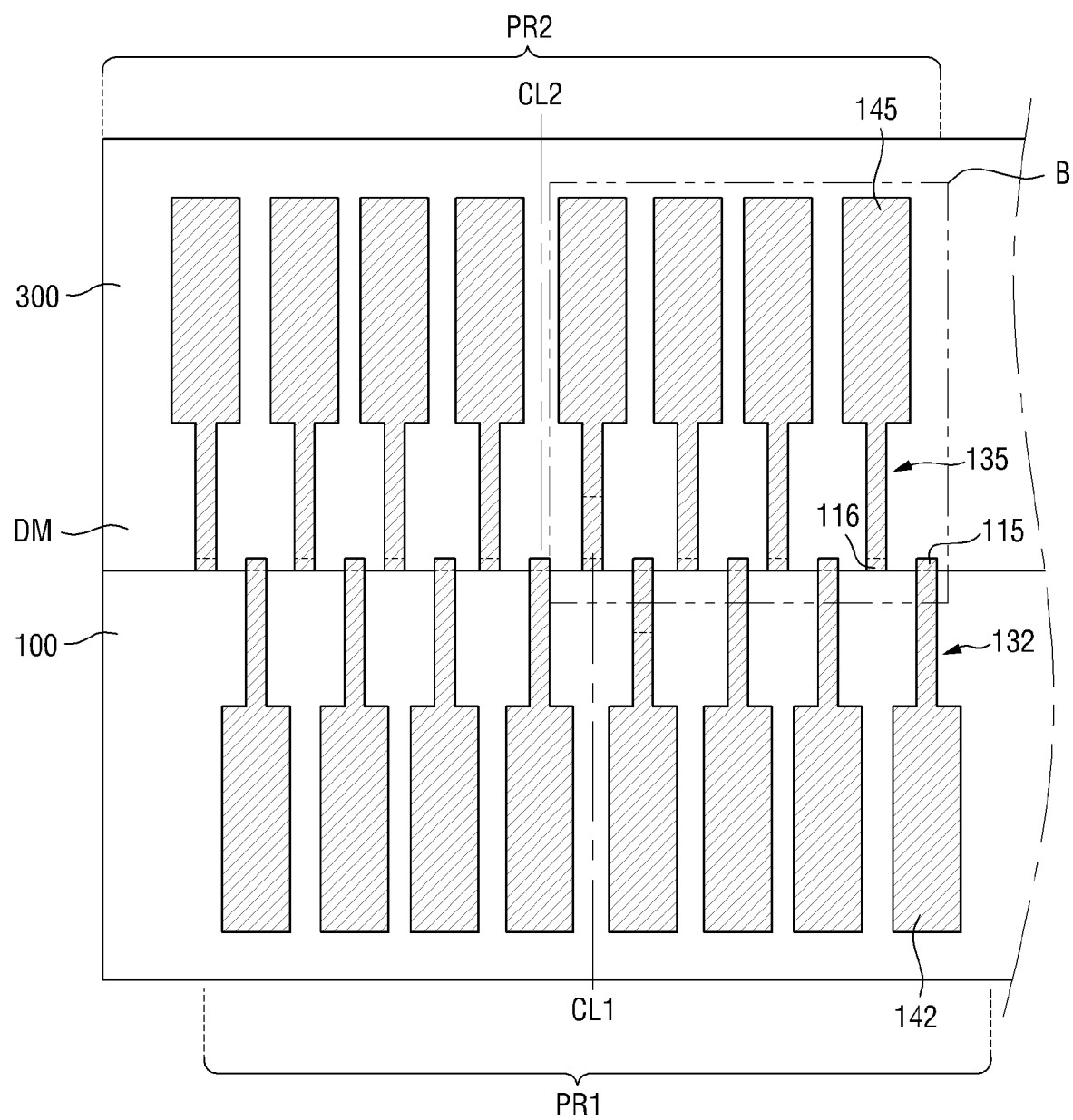
FIG. 24 is a schematic plan view showing a layout of signal pads disposed on a first substrate and a second substrate according to yet another embodiment of the disclosure.

FIG. 24 is a schematic plan view showing a layout of signal pads disposed on a first substrate and a second substrate according to yet another embodiment of the disclosure.

A display device according to the embodiment shown in FIG. 24 may be different from the display device according to the embodiment shown in FIG. 10 in that only fifth signal pad 135 and 145 may be disposed on the side surface of the second substrate 300, and only second signal pads 132 and 142 may be disposed on the side of the first substrate 100.

The shape of the second signal pad 132 and 142 has been described above with reference to FIG. 6, and the shape of the fifth signal pad 135 and 145 has been described above with reference to FIG. 10; and, therefore, the redundant description will be omitted.

Although embodiments have been disclosed for illustrative purposes, those skilled in the art will appreciate that various modifications, additions and substitutions are possible, without departing from the scope and spirit of the disclosure as disclosed in the accompanying claims and their equivalents.

What is claimed is:

1. A display device comprising:
   a first substrate comprising an upper surface and a first side surface;
   first signal lines disposed on the upper surface of the first substrate; and
   a first signal pad array comprising first signal pads disposed on the first side surface of the first substrate and spaced apart from one another in a first direction,
   wherein each of the first signal pads comprises:

a first pad portion connected to a corresponding one of the first signal lines;
a second pad portion having a width larger than a width of the first pad portion; and
a third pad portion connecting the first pad portion with the second pad portion and having a width smaller than the width of the second pad portion,
wherein the first signal pads are disposed in a shape symmetrical with respect to an imaginary line dividing the first signal pad array into equal halves, and
wherein each of the first signal pads has an angle between a direction in which the third pad portion is extended and a direction in which the second pad portion is extended, and the angle of a first signal pad closer to the imaginary line is smaller than the angle of another first signal pad further away from the imaginary line.

2. The display device of claim 1, further comprising:
a second substrate facing the upper surface of the first substrate; and
a liquid-crystal layer disposed between the first substrate and the second substrate.

3. The display device of claim 2, further comprising:
a first flexible printed circuit board attached to the first signal pads; and
an anisotropic conductive film disposed between the first flexible printed circuit board and the second pad portion of each of the first signal pads.

4. The display device of claim 3, wherein the first flexible printed circuit board comprises:
a first connection pad electrically connected to the second pad portion via the anisotropic conductive film; and
a first driver chip.

5. The display device of claim 4, further comprising a printed circuit board, wherein
the first flexible printed circuit board includes a second connection pad spaced apart from the first connection pad, and
the printed circuit board is attached to the second connection pad.

6. The display device of claim 4, further comprising:
a second signal pad array comprising second signal pads spaced apart from one another in the first direction, the second signal pad array being spaced apart from the first signal pad array in the first direction,
wherein each of the second signal pads comprises:
a first pad portion connected to a corresponding one of the first signal lines;
a second pad portion having a width larger than a width of the first pad portion; and
a third pad portion connecting the first pad portion with the second pad portion and having a width smaller than the width of the second pad portion,
wherein the second signal pads are disposed in a shape symmetrical with respect to an imaginary line dividing the second signal pad array into equal halves, and
wherein each of the second signal pads has an angle between a direction in which the third pad portion is extended and a direction in which the second pad portion is extended, and the angle of a second signal pad closer to the imaginary line is smaller than the angle of another second signal pad further away from the imaginary line.

7. The display device of claim 6, further comprising:
a second flexible printed circuit board attached to the second signal pads; and
an anisotropic conductive film disposed between the second flexible printed circuit board and the second pad portion of each of the second signal pads,
wherein the second flexible printed circuit board comprises:
a second connection pad electrically connected to the second pad portion via the anisotropic conductive film; and
a second driver chip.

8. The display device of claim 4, further comprising:
second signal lines each disposed between adjacent ones of the first signal lines; and
a dummy member disposed between the first substrate and the second substrate.

9. The display device of claim 8, wherein
the second substrate comprises a second side surface aligned with the first side surface,
a side surface of the dummy member is aligned with the first side surface and the second side surface, and
the display device comprises a second signal pad array comprising second signal pads disposed on the second side surface of the second substrate and on the side surface of the dummy member and spaced apart from one another in the first direction.

10. The display device of claim 9, wherein each of the second signal pads comprises:
a fourth pad portion connected to a corresponding one of the second signal lines;
a fifth pad portion having a width larger than a width of the fourth pad portion; and
a sixth pad portion connecting the fourth pad portion with the fifth pad portion and having a width smaller than the width of the fifth pad portion,
wherein the second signal pads are disposed in a shape symmetrical with respect to an imaginary line dividing the second signal pad array into equal halves, and
wherein each of the second signal pads has an angle between a direction in which the sixth pad portion is extended and a direction in which the fifth pad portion is extended, and the angle of a second signal pad closer to the imaginary line is smaller than the angle of another second signal pad further away from the imaginary line.

11. The display device of claim 10, further comprising:
a second flexible printed circuit board attached to the second signal pads; and
an anisotropic conductive film disposed between the second flexible printed circuit board and the fifth pad portion of each of the second signal pads.

12. The display device of claim 11, wherein the second flexible printed circuit board comprises:
a second connection pad electrically connected to the fifth pad portion via the anisotropic conductive film; and
a second driver chip.

13. The display device of claim 12, wherein the first flexible printed circuit board and the second flexible printed circuit board partially overlap each other.

14. The display device of claim 4, further comprising:
second signal lines spaced apart from the first signal lines in the first direction; and
a dummy member disposed between the first substrate and the second substrate.

15. The display device of claim 14, wherein
the second substrate comprises a second side surface aligned with the first side surface,
a side surface of the dummy member is aligned with the first side surface and the second side surface, and the display device comprises a second signal pad array comprising second signal pads disposed on the second side surface of the second substrate and on the side surface of the dummy member and spaced apart from one another in the first direction.

16. The display device of claim 15, wherein each of the second signal pads comprises:
a fourth pad portion connected to a corresponding one of the second signal lines;
a fifth pad portion having a width larger than a width of the fourth pad portion; and
a sixth pad portion connecting the fourth pad portion with the fifth pad portion and having a width smaller than the width of the fifth pad portion,
wherein the second signal pads are disposed in a shape symmetrical with respect to an imaginary line dividing the second signal pad array into equal halves, and
wherein each of the second signal pads has an angle between a direction in which the sixth pad portion is extended and a direction in which the fifth pad portion is extended, and the angle of a second signal pad closer to the imaginary line is smaller than the angle of another second signal pad further away from the imaginary line.

17. The display device of claim 16, wherein
the display device comprises a plurality of first signal pad arrays and a plurality of second signal pad arrays, and
each of the second signal pad arrays is disposed between adjacent ones of the first signal pad arrays.

18. The display device of claim 1, wherein the angle between the direction in which the third pad portion is extended and the direction in which the second pad portion is extended is from about 0 degree to about 90 degrees.

19. The display device of claim 1, wherein the first pad portion and the second pad portion are extended in the first direction.

20. The display device of claim 1, further comprising an anisotropic conductive film disposed between the first signal lines and the first pad portion, wherein the first signal lines and the first pad portion are electrically connected via the anisotropic conductive film.

21. The display device of claim 1, wherein
the first signal lines are extended to the first side surface of the first substrate, and
the first pad portion is connected to a portion of a corresponding one of the first signal lines, the portion being extended to the first side surface of the first substrate.

22. The display device of claim 21, wherein the portion extended to the first side surface of the first substrate is electrically connected to the first pad portion via the anisotropic conductive film.

23. The display device of claim 1, wherein a width of the first pad portion is equal to a width of the third pad portion.

24. A display device comprising:
a thin-film transistor substrate comprising an upper surface and a first side surface;
a color filter substrate facing the upper surface of the thin-film transistor substrate;
first signal lines disposed on the upper surface of the thin-film transistor substrate;
a first signal pad array comprising first signal pads disposed on the first side surface of the thin-film transistor substrate and spaced apart from one another in a first direction;
a flexible printed circuit board attached to the first signal pads and
an anisotropic conductive film disposed between the flexible printed circuit board and the second pad portion of each of the first signal pads,
wherein each of the first signal pads comprises:
a first pad portion connected to a corresponding one of the first signal lines;
a second pad portion having a width larger than a width of the first pad portion; and
a third pad portion between the first pad portion with the second pad portion and having a width smaller than the width of the second pad portion,
wherein the first signal pads are disposed in a shape symmetrical with respect to an imaginary line dividing the first signal pad array into equal halves, and
wherein each of the first signal pads has an angle between a direction in which the third pad portion is extended and a direction in which the second pad portion is extended, and the angle of a first signal pad closer to the imaginary line is smaller than the angle of another first signal pad further away from the imaginary line.

25. The display device of claim 24, wherein the flexible printed circuit board comprises:
a first connection pad electrically connected to the second pad portion via the anisotropic conductive film; and
a first driver chip.

26. The display device of claim 25, further comprising a printed circuit board, wherein
the flexible printed circuit board includes a second connection pad spaced apart from the first connection pad, and
the printed circuit board is attached to the second connection pad.

27. The display device of claim 24, further comprising:
a sealing member disposed on the first side surface of the thin-film transistor substrate and overlapping the first pad portion and the second pad portion.

28. The display device of claim 27, wherein the sealing member is disposed between the flexible printed circuit board and the first signal pads.

29. The display device of claim 27, wherein the sealing member does not overlap the third pad portion.

* * * * *